United States Patent
Liu et al.

(10) Patent No.: US 12,481,874 B2
(45) Date of Patent: Nov. 25, 2025

(54) DISTRIBUTED ADVERSARIAL TRAINING FOR ROBUST DEEP NEURAL NETWORKS

(71) Applicant: International Business Machines Corporation, Armonk, NY (US)

(72) Inventors: Sijia Liu, Somerville, MA (US);
Gaoyuan Zhang, Medford, MA (US);
Pin-Yu Chen, White Plains, NY (US);
Chuang Gan, Cambridge, MA (US);
Songtao Lu, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 1206 days.

(21) Appl. No.: 17/170,343

(22) Filed: Feb. 8, 2021

(65) Prior Publication Data

US 2022/0261626 A1  Aug. 18, 2022

(51) Int. Cl.
*G06N 3/08* (2023.01)
*G06N 3/04* (2023.01)

(52) U.S. Cl.
CPC .................. *G06N 3/08* (2013.01); *G06N 3/04* (2013.01)

(58) Field of Classification Search
CPC ............ G06N 3/08; G06N 3/04; G06N 3/045; G06N 3/084; G06N 3/063; G06N 3/098; G06N 3/094; G06N 3/0895
See application file for complete search history.

(56) References Cited

U.S. PATENT DOCUMENTS 10,007,866 B2 * 6/2018 Criminisi ............ G06F 18/2413
10,521,718 B1  12/2019 Szegedy et al.
(Continued)

FOREIGN PATENT DOCUMENTS

WO   WO2019222401 A2   11/2019

OTHER PUBLICATIONS

Wong, Eric, Leslie Rice, and J Zico Kolter. "Fast Is Better than Free: Revisiting Adversarial Training." arXiv.org (2020): n. pag. Web. (Year: 2020).*

(Continued)

*Primary Examiner* — Daniel T Pellett
(74) *Attorney, Agent, or Firm* — Anthony Curro

(57) ABSTRACT

Scalable distributed adversarial training techniques for robust deep neural networks are provided. In one aspect, a method for adversarial training of a deep neural network-based model by distributed computing machines M includes, by distributed computing machines M: obtaining adversarial perturbation-modified training examples for samples in a local dataset $D^{(i)}$; computing gradients of a local cost function $f_i$ with respect to parameters $\theta$ of the deep neural network-based model using the adversarial perturbation-modified training examples; transmitting the gradients of the local cost function $f_i$ to a server which aggregates the gradients of the local cost function $f_i$ and transmits an aggregated gradient to the distributed computing machines M; and updating the parameters $\theta$ of the deep neural network-based model stored at each of the distributed computing machines M based on the aggregated gradient received from the server. A method for distributed adversarial training of a deep neural network-based model by the server is also provided.

15 Claims, 14 Drawing Sheets

(56) References Cited

U.S. PATENT DOCUMENTS

| | | | |
|---|---|---|---|
| 2019/0130110 A1* | 5/2019 | Lee | G06N 3/08 |
| 2019/0244103 A1 | 8/2019 | Wang et al. | |
| 2020/0134468 A1* | 4/2020 | Ding | G06V 10/764 |
| 2020/0143240 A1 | 5/2020 | Baker | |
| 2020/0234110 A1 | 7/2020 | Singh et al. | |
| 2020/0311558 A1 | 10/2020 | Tan et al. | |
| 2020/0311913 A1 | 10/2020 | Soni et al. | |
| 2020/0387777 A1* | 12/2020 | Avestimehr | G06N 20/20 |
| 2021/0192357 A1* | 6/2021 | Sinha | G06N 3/084 |
| 2023/0222354 A1* | 7/2023 | Abrahamyan | G06N 3/088 706/15 |

OTHER PUBLICATIONS

Alistarh, Dan et al. QSGD: Communication-Efficient SGD via Gradient Quantization and Encoding. arXiv, 2017. Print (Year: 2017).*

Carmon, Yair, Aditi Raghunathan, Ludwig Schmidt, Percy Liang, John C. Duchi, "Unlabeled Data Improves Adversarial Robustness" https://doi.org/10.48550/arXiv.1905.13736 2019 (Year: 2019).*

QSGD: Communication-Efficient SGD via Gradient Quantization and Encoding (Year: 2017).*

Carlini et al., "Towards Evaluating the Robustness of Neural Networks," arXiv:1608.04644v2 (Mar. 2017) (19 pages).

He et al., "Deep Residual Learning for Image Recognition," arXiv:1512.03385v1 (Dec. 2015) (12 pages).

He et al., "Identity Mappings in Deep Residual Networks," arXiv:1603.05027v3 (Jul. 2016) (15 pages).

Shafahi et al., "Adversarially Robust Transfer Learning," ICLR 2020, arXiv:1905.08232v2 (Feb. 2020) (14 pages).

Wang et al., "On the Convergence and Robustness of Adversarial Training," Proceedings of the 36th International Conference on Machine Learning, Jun. 2019 (10 pages).

Carmon et al., "Unlabeled Data Improves Adversarial Robustness," arXiv:1905.13736v3 (Dec. 2019) (44 pages).

Goyal et al., "Accurate, Large Minibatch SGD: Training ImageNet in 1 hour," arXiv:1706.02677v2 (Apr. 2018) (12 pages).

Liu et al., "A Decentralized Parallel Algorithm for Training Generative Adversarial Nets," 34th Conference on Neural Information Processing Systems 2020, arXiv:1910.12999v6 (Oct. 2020) (26 pages).

Xie et al., "Feature Denoising for Improving Adversarial Robustness," arXiv:1812.03411v2 (Mar. 2019) (9 pages).

You et al., "Large Batch Optimization for Deep Learning: Training BERT in 76 Minutes," ICLR 2020, arXiv:1904.00962v5 (Jan. 2020) (37 pages).

You et al., "Scaling SGD batch size to 32K for ImageNet training." Technical Report, Sep. 2017 (12 pages).

You et al., "ImageNet Training in Minutes," arXiv:1709.05011v10 (Jan. 2018) (11 pages).

Yu et al., "Double Quantization for Communication-Efficient Distributed Optimization," arXiv:1805.10111v4 (May 2019) (21 pages).

H. Zhang et al., "Theoretically Principled Trade-off between Robustness and Accuracy," arXiv:1901.08573v3 (Jun. 2019) (31 pages).

Mell et al., "The NIST Definition of Cloud Computing," NIST Special Publication 800-145, Sep. 2011 (7 pages).

Szegedy et al., Intriguing properties of neural networks, arXiv:1312.6199v4 (Feb. 2014) (10 pages).

Xu et al., "Structured Adversarial Attack: Towards General Implementation and Better Interpretability," ICLR 2019, arXiv:1808.01664v3 (Feb. 2019) (21 pages).

Shafahi et al., "Adversarial Training for Free!," 33rd Conference on Neural Information Processing Systems 2019, arXiv:1904.12843v2 (Nov. 2019) (12 pages).

D. Zhang et al., "You Only Propagate Once: Accelerating Adversarial Training via Maximal Principle," 33rd Conference on Neural Information Processing Systems 2019, arXiv:1905.00877v6 (Nov. 2019) (16 pages).

X. Liu et al., "ADV-BNN: Improved Adversarial Defense through Robust Bayesian Neural Network," 7th international Conference on Learning Representations, ICLR 2019, arXiv:1810.01279v2 (May 2019) (13 pages).

Gaoyuan Zhang, Songtao Lu, Sijia Liu, Xiangyi Chen, Pin-Yu Chen, Lee Martie, Lior Horesh, Mingyi Hong, "Distributed Adversarial Training to Robustify Deep Neural Networks at Scale," ICLR 2021 Conference Blind Submission, publicly available Sep. 28, 2020 (28 pages)—Grace Period Disclosure.

Gaoyuan Zhang, Songtao Lu, Sijia Liu, Xiangyi Chen, Pin-Yu Chen, Lee Martie, Lior Horesh, Mingyi Hong, "Distributed Adversarial Training to Robustify Deep Neural Networks at Scale," ICLR 2021 Conference Blind Submission, publicly available Oct. 2, 2020 (27 pages)—Grace Period Disclosure.

Gaoyuan Zhang, Songtao Lu, Sijia Liu, Xiangyi Chen, Pin-Yu Chen, Lee Martie, Lior Horesh, Mingyi Hong, "Distributed Adversarial Training to Robustify Deep Neural Networks at Scale," ICLR 2021 Conference Blind Submission, publicly available Nov. 23, 2020 (28 pages)—Grace Period Disclosure.

Gaoyuan Zhang, Songtao Lu, Sijia Liu, Xiangyi Chen, Pin-Yu Chen, Lee Martie, Lior Horesh, Mingyi Hong, "Distributed Adversarial Training to Robustify Deep Neural Networks at Scale," ICLR 2021 Conference Blind Submission, publicly available Nov. 24, 2020 (28 pages)—Grace Period Disclosure.

Alistarh et al., "QSGD: Communication-Efficient SGD via Gradient Quantization and Encoding," 31st Conference on Neural information Processing Systems 2017, arXiv:1610.02132v4 (Dec. 2017) (28 pages).

Madry et al., "Towards deep learning models resistant to adversarial attacks," arXiv:1706.06083v4 (Sep. 2019) (28 pages).

Wong et al., "Fast is better than free: Revisiting adversarial training," ICLR 2020, arXiv:2001.03994v1 (Jan. 2020) (17 pages).

* cited by examiner

400

1: for Iteration $t = 1, 2, \ldots, T$
2:   for Worker $i = 1, 2, \ldots, M$     ▷ Block 1
3:     Sample-wise perturbation modified example generation (A1)
4:     Local gradient computation (A2)
5:     Worker-server communication (optional)
6:   end for
7: Gradient aggregation at server (A3) ▷ Block 2
8: Server-worker communication (optional)
9: for Worker $i = 1, 2, \ldots, M$     ▷ Block 3
10:    Model parameter update (A4)
11: end for

| Method | Dataset 1, DNN model 1 | | | | | |
|---|---|---|---|---|---|---|
| | $p \times q$ | Batch size | TA (%) | RA (%) | Comm. | Tr. time |
| AT | 1 × 1 | 2048 | 82.94 | 38.54 | NA | 218 |
| Fast AT | 1 × 1 | 2048 | 81.58 | 38.34 | NA | 52 |
| DAT-PGD w/o LALR | 18 × 1 | 18 × 2048 | 55.59 | 26.83 | 3.4 | 22 |
| DAT-FGSM w/o LALR | 18 × 1 | 18 × 2048 | 52.35 | 28.90 | 3.1 | 8 |
| DAT-LSGD | 18 × 1 | 18 × 2048 | 64.15 | 34.12 | 3.2 | 22 |
| DAT-PGD | 18 × 1 | 18 × 2048 | 80.28 | 38.44 | 3.4 | 22 |
| DAT-FGSM | 18 × 1 | 18 × 2048 | 73.42 | 38.55 | 3.1 | 8 |
| DAT-FGSM | 24 × 1 | 24 × 2048 | 72.76 | 39.82 | 2.0 | 5 |
| | Dataset 2, DNN model 2 | | | | | |
| AT | 1 × 6 | 512 | 62.70 | 40.38 | NA | 6022 |
| Fast AT | 1 × 6 | 512 | 58.99 | 40.78 | NA | 1544 |
| DAT-PGD w/o LALR | 6 × 6 | 6 × 512 | 57.09 | 34.02 | 865 | 1932 |
| DAT-FGSM w/o LALR | 6 × 6 | 6 × 512 | 55.04 | 35.03 | 863 | 1080 |
| DAT-PGD | 6 × 6 | 6 × 512 | 63.75 | 38.45 | 898 | 1960 |
| DAT-FGSM | 6 × 6 | 6 × 512 | 58.32 | 41.48 | 859 | 1109 |

| Method | Dataset 1 + 500K unlabeled images, DNN model 1 | | | |
|---|---|---|---|---|
| | TA (%) | RA (%) | Comm. | Tr. time |
| DAT-PGD | 87.00 (↑7.62) | 47.34 (↑8.40) | 86 | 451 |
| DAT-FGSM | 88.00 (↑12.42) | 45.84 (↑4.92) | 86 | 124 |

1000

| Method | # machines × batch size per machine | TA (%) | RA (%) |
|---|---|---|---|
| DAT-PGD (w/ LALR) | 6 × 341 | 83.48 | 39.76 |
| AT w/ LALR | 1 × 2048 | 83.56 | 39.84 |
| DAT w/o LALR | 6 × 341 | 82.42 | 38.41 |
| AT (w/o LALR) | 1 × 2048 | 82.94 | 38.54 |

Algorithm A1 Distributed adversarial training (DAT) for solving problem in Equation 2

1: Input: Initial $\theta_1$, dataset $\mathcal{D}^{(i)}$ for each of $M$ workers, and $T$ iterations
2: for Iteration $t = 1, 2, \ldots, T$
3:     for Worker $i = 1, 2, \ldots, M$     ▷ Worker
4:         Draw a finite-size data batch $\mathcal{B}_t^i \subseteq \mathcal{D}^{(i)}$
5:         For each data sample $\mathbf{x} \in \mathcal{B}_t^i$, call for an *inner maximization oracle*:

$$\delta_t^{(i)}(\mathbf{x}) := \arg\max_{\|\delta\|_\infty \leq \epsilon} \phi(\theta_t, \delta; \mathbf{x}), \quad (A1)$$

where we omit the label or possible pseudo-label $y$ of $\mathbf{x}$ for brevity
6:         Computing local gradient of $f_i$ in (2) with respect to $\theta$ given perturbed samples:

$$\mathbf{g}_t^{(i)} = \lambda \mathbb{E}_{\mathbf{x} \in \mathcal{B}_t^{(i)}}[\nabla_\theta \ell(\theta_t; \mathbf{x})] + \mathbb{E}_{\mathbf{x} \in \mathcal{B}_t^{(i)}}[\nabla_\theta \phi(\theta_t; \mathbf{x} + \delta_t^{(i)}(\mathbf{x}))] \quad (A2)$$

7:         (*Optional*) Call for *gradient quantizer* $Q(\cdot)$ and transmit $Q(\mathbf{g}_t^{(i)})$ to server
8:     end for
9:     Gradient aggregation at server:     ▷ Server $$\hat{\mathbf{g}}_t = \tfrac{1}{M} \sum_{i=1}^M Q(\mathbf{g}_t^{(i)}) \quad (A3)$$

10:     (*Optional*) Call for *gradient quantizer* $\hat{\mathbf{g}}_t \leftarrow Q(\hat{\mathbf{g}}_t)$, and transmit $\hat{\mathbf{g}}_t$ to workers:
11:     for Worker $i = 1, 2, \ldots, M$     ▷ Worker
12:         Call for an *outer minimization oracle* $\mathcal{A}(\cdot)$ to update $\theta$:

$$\theta_{t+1} = \mathcal{A}(\theta_t, \hat{\mathbf{g}}_t, \eta_t), \quad \eta_t \text{ is learning rate} \quad (A4)$$

13:     end for
14: end for

FIG. 11

Algorithm A2 LAMB

Input: learning rate $\eta_t$, $0 < \beta_1, \beta_2 < 1$, scaling function $\tau(\cdot)$, $\zeta > 0$
for $t = 1, \ldots$ do
  $\mathbf{m}_t = \beta_1 \mathbf{m}_{t-1} + (1 - \beta_1)\hat{\mathbf{g}}_t$, where $\hat{\mathbf{g}}_t$ is given by Equation A3
  $\mathbf{v}_t = \beta_2 \mathbf{v}_{t-1} + (1 - \beta_2)\hat{\mathbf{g}}_t^2$
  $\mathbf{m}_t = \mathbf{m}_t/(1 - \beta_1^t)$
  $\mathbf{v}_t = \mathbf{v}_t/(1 - \beta_2^t)$
  Compute ratio $\mathbf{u}_t = \frac{\mathbf{m}_t}{\sqrt{\mathbf{v}_t} + \zeta}$
end for
Update $$\theta_{t+1,i} = \theta_{t,i} - \frac{\eta_t \tau(\|\theta_{t,i}\|)}{\|\mathbf{u}_{t,i}\|} \mathbf{u}_{t,i}. \quad (A30)$$

FIG. 12

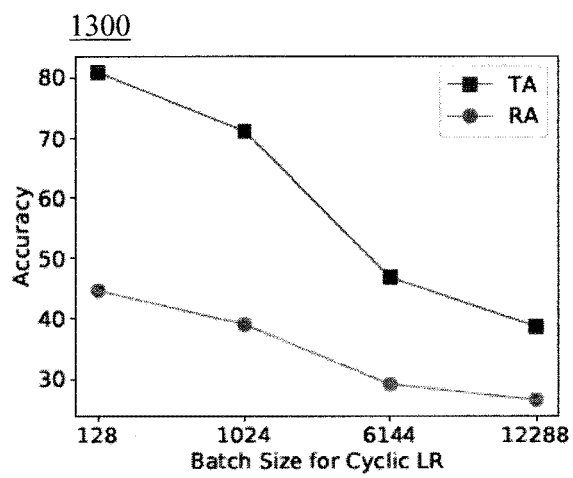

FIG. 13

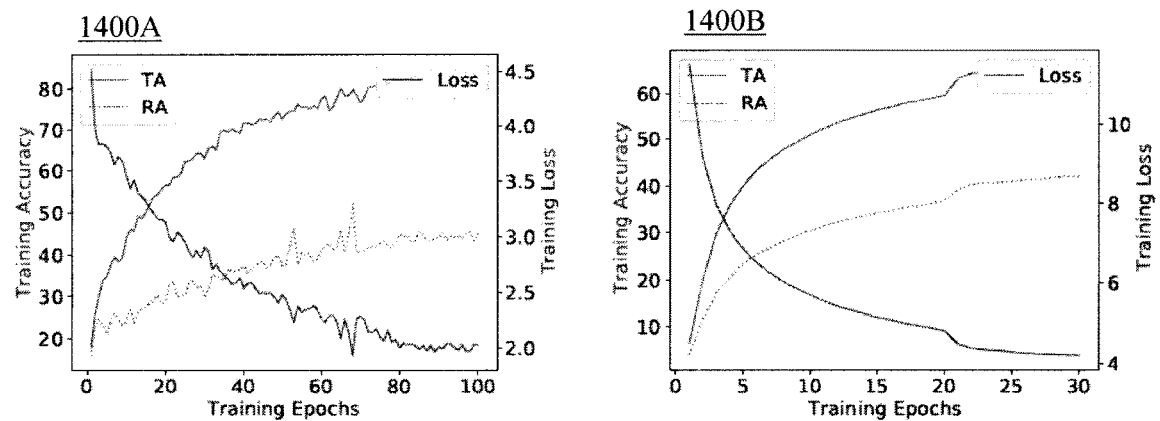

FIG. 14A      FIG. 14B

1500
| Value of $c_u$ | TA (%) | RA (%) |
|---|---|---|
| $c_u = 8$ | 73.57 | 38.19 |
| $c_u = 9$ | 73.72 | 38.00 |
| $c_u = 10$ | 73.42 | 38.55 |
| $c_u = 11$ | 73.75 | 38.18 |
| $c_u = 12$ | 73.63 | 37.87 |
FIG. 15
1600
| Method | Dataset 1, DNN model 2 | | | | | |
|---|---|---|---|---|---|---|
| | $p \times q$ | Batch size | TA (%) | RA (%) | Comm. per epoch (s) | Tr. Time per epoch (s) |
| AT | $1 \times 1$ | 256 | 85.94 | 43.06 | NA | 894 |
| Fast AT | $1 \times 1$ | 256 | 75.28 | 40.48 | NA | 288 |
| DAT-PGD w/o LALR | $6 \times 1$ | $6 \times 256$ | 74.45 | 33.35 | 68 | 236 |
| DAT-PGD | $6 \times 1$ | $6 \times 256$ | 84.79 | 42.16 | 68 | 236 |
| DAT-FGSM | $6 \times 1$ | $6 \times 256$ | 75.72 | 40.09 | 68 | 116 |
FIG. 16
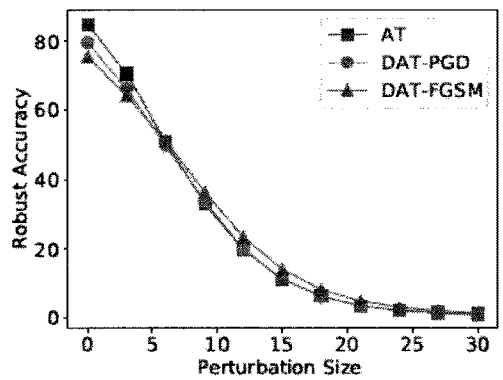
FIG. 17A
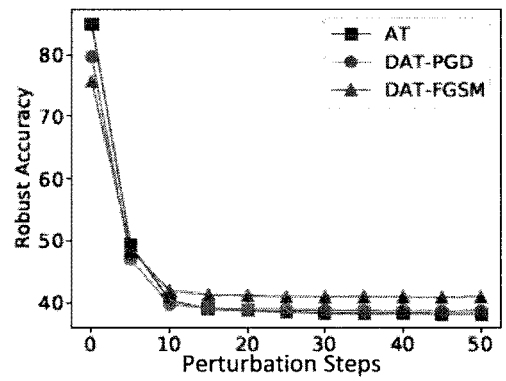
FIG. 17B

2000

| Method | Dataset 1, DNN model 1 | | | | |
| --- | --- | --- | --- | --- | --- |
| | # bits | TA (%) | RA (%) | Comm. per epoch (s) | Data transmitted per iteration (MB) |
| DAT-PGD | 32 | 80.38 | 38.94 | 8.5 | 1278 |
| DAT-PGD | 16 | 79.38 | 38.32 | 8.3 | 639 |
| DAT-PGD | 8 | 78.18 | 37.34 | 4.3 | 320 |
| DAT-PGD | 8 (2-sided) | 78.86 | 34.2 | 5.0 | 107 |
| DAT-FGSM | 32 | 75.58 | 40.92 | 8.5 | 1278 |
| DAT-FGSM | 16 | 75.74 | 40.86 | 8.3 | 639 |
| DAT-FGSM | 8 | 72.48 | 38.98 | 4.3 | 320 |
| DAT-FGSM | 8 (2-sided) | 69.26 | 35.34 | 5.0 | 107 |

| Method | Dataset 2, DNN model 2 | | | | |
| --- | --- | --- | --- | --- | --- |
| | # bits | TA (%) | RA (%) | Comm. per epoch (s) | Data transmitted per iteration (MB) |
| DAT-PGD | 32 | 63.75 | 38.45 | 898 | 2924 |
| DAT-PGD | 16 | 61.77 | 38.40 | 850 | 1462 |
| DAT-PGD | 8 | 56.53 | 37.90 | 592 | 731 |
| DAT-PGD | 8 (2-sided) | 53.09 | 34.59 | 1091 | 244 |
| DAT-FGSM | 32 | 58.32 | 41.48 | 859 | 2924 |
| DAT-FGSM | 16 | 54.71 | 39.29 | 849 | 1462 |
| DAT-FGSM | 8 | 50.11 | 36.38 | 594 | 731 |
| DAT-FGSM | 8 (2-sided) | 48.27 | 33.20 | 1013 | 244 |

| Method | Dataset 2, DNN model 2 | | | | |
| --- | --- | --- | --- | --- | --- |
| | # bits | TA (%) | RA (%) | Comm. per epoch (s) | Tr. time per epoch (s) |
| DAT-PGD | 32 | 63.75 | 38.45 | 898 | 1960 |
| DAT-FGSM | 32 | 58.32 | 41.48 | 859 | 1109 |
| DAT-PGD (HPC) | 32 | 63.43 | 38.55 | 15 | 1074 |
| DAT-FGSM (HPC) | 32 | 57.60 | 41.70 | 15 | 310 |

| Method | Dataset 1, DNN model 1 | | | |
| --- | --- | --- | --- | --- |
| | 8-bit quantization (s) | Batch size | TA (%) | RA (%) |
| Fast AT | No | 2048 | 81.58 | 38.34 |
| Fast AT w/ LALR | Yes | 2048 | 80.66 | 38.60 |
| Fast AT w/ LALR | No | 6 x 2048 | 80.08 | 38.51 |
| Fast AT w/ LALR | Yes | 6 x 2048 | 75.53 | 38.45 |

FIG. 22

DISTRIBUTED ADVERSARIAL TRAINING FOR ROBUST DEEP NEURAL NETWORKS

STATEMENT REGARDING PRIOR DISCLOSURES BY THE INVENTOR OR A JOINT INVENTOR

The following disclosure(s) are submitted under 35 U.S.C. 102(b)(1)(A):

DISCLOSURE(S)

"Distributed Adversarial Training to Robustify Deep Neural Networks at Scale," Gaoyuan Zhang, Songtao Lu, Sijia Liu, Xiangyi Chen, Pin-Yu Chen, Lee Martie, Lior Horesh, Mingyi Hong, ICLR 2021 Conference Blind Submission, publicly available Sep. 28, 2020 (28 pages).

"Distributed Adversarial Training to Robustify Deep Neural Networks at Scale," Gaoyuan Zhang, Songtao Lu, Sijia Liu, Xiangyi Chen, Pin-Yu Chen, Lee Martie, Lior Horesh, Mingyi Hong, ICLR 2021 Conference Blind Submission, publicly available Oct. 2, 2020 (27 pages).

"Distributed Adversarial Training to Robustify Deep Neural Networks at Scale," Gaoyuan Zhang, Songtao Lu, Sijia Liu, Xiangyi Chen, Pin-Yu Chen, Lee Martie, Lior Horesh, Mingyi Hong, ICLR 2021 Conference Blind Submission, publicly available Nov. 23, 2020 (28 pages).

"Distributed Adversarial Training to Robustify Deep Neural Networks at Scale," Gaoyuan Zhang, Songtao Lu, Sijia Liu, Xiangyi Chen, Pin-Yu Chen, Lee Martie, Lior Horesh, Mingyi Hong, ICLR 2021 Conference Blind Submission, publicly available Nov. 24, 2020 (28 pages).

"Distributed Adversarial Training to Robustify Deep Neural Networks at Scale," Gaoyuan Zhang, Songtao Lu, Sijia Liu, Xiangyi Chen, Pin-Yu Chen, Lee Martie, Lior Horesh, Mingyi Hong, ICLR 2021 Conference Blind Submission, publicly available Nov. 24, 2020 (28 pages).

FIELD OF THE INVENTION

The present invention relates to adversarial training of deep neural networks, and more particularly, to scalable distributed adversarial training techniques for robust deep neural networks.

BACKGROUND OF THE INVENTION

The rapid increase of research in deep neural networks and their adoption in practice is, in part, owed to the significant breakthroughs made with deep neural networks in computer vision. However, there remains a serious weakness of robustness. Namely, while trained networks tend to be very effective in classifying benign inputs, an adversary can manipulate or perturb the inputs to a deep neural network (adversarial perturbations) such that drastically different classifications are produced. For instance, in the context of computer vision applications, a slight (imperceptible) change to an input image can result in an incorrect classification. Thus, adversarial perturbations are considered to be one of the major hurdles for using deep neural networks in real-world applications.

As such, techniques for training deep neural networks to be robust against adversarial perturbations are now a major focus in research. Unfortunately, most of these techniques are far from satisfactory. An exception is the adversarial training approach. Adversarial training mitigates the negative impact of adversarial perturbations by virtue of a min-max robust training method that minimizes the worst-case training loss at adversarially perturbed examples (adversarial examples). However, while effective, the adversarial training approaches that have been applied are generally difficult to properly scale to large networks on large datasets.

Therefore, effective scaling techniques for adversarial training would be desirable.

SUMMARY OF THE INVENTION

The present invention provides scalable distributed adversarial training techniques for robust deep neural networks. In one aspect of the invention, a method for adversarial training of a deep neural network-based model by distributed computing machines M is provided. The method includes: obtaining, by each of the distributed computing machines M, adversarial perturbation-modified training examples for samples in a local dataset $D^{(i)}$; computing, by each of the distributed computing machines M, gradients of a local cost function $f_i$ with respect to parameters $\theta$ of the deep neural network-based model using the adversarial perturbation-modified training examples; transmitting, from each of the distributed computing machine M, the gradients of the local cost function $f_i$ to a server which aggregates the gradients of the local cost function $f_i$ and transmits an aggregated gradient to the distributed computing machines M; and updating, by each of the distributed computing machines M, the parameters $\theta$ of the deep neural network-based model stored at each of the distributed computing machines M based on the aggregated gradient received from the server.

In another aspect of the invention, a method for distributed adversarial training of a deep neural network-based model by a server is provided. The method includes: obtaining, by the server, gradients of a local cost function $f_i$ that have been computed with respect to parameters $\theta$ of the deep neural network-based model by a plurality of distributed computing machines M using adversarial perturbation-modified training examples for samples in a local dataset $D^{(i)}$; aggregating, by the server, the gradients of the local cost function $f_i$; and transmitting, from the server, an aggregated gradient to the plurality of distributed computing machines M to update the parameters $\theta$ of the deep neural network-based model stored at each of the plurality of distributed computing machines M.

A more complete understanding of the present invention, as well as further features and advantages of the present invention, will be obtained by reference to the following detailed description and drawings.

BRIEF DESCRIPTION OF THE DRAWINGS

FIG. 4 is a diagram illustrating an exemplary implementation of the methodologies of FIG. 2 and FIG. 3 for distributed adversarial training of a deep neural network-based model according to an embodiment of the present invention;

FIG. 5 is a diagram illustrating overall performance of the present distributed adversarial training approach as compared with baselines according to an embodiment of the present invention;

FIG. 10 is a diagram illustrating the effect of layerwise adaptive learning rate (LALR) on centralized and distributed training according to an embodiment of the present invention;

FIG. 11 is a diagram illustrating a detailed implementation (Algorithm A1) of the present distributed adversarial training approach according to an embodiment of the present invention;

FIG. 12 is a diagram illustrating the LAMB Algorithm A2 according to an embodiment of the present invention;

FIG. 13 is a diagram illustrating the performance of Fast AT with cyclic learning rate (CLR) versus batch sizes according to an embodiment of the present invention;

FIG. 14A is a diagram illustrating training accuracy and loss value of DAT-PGD using a 6×1 computing configuration and 6×2048 batch size according to an embodiment of the present invention;

FIG. 14B is a diagram illustrating training accuracy and loss value of DAT-PGD using a 6×6 computing configuration and 6×512 batch size according to an embodiment of the present invention;

FIG. 15 is a diagram illustrating the TA/RA of DAT-FGSM using 18×2048 batch size versus different choices of LALR hyperparameter $c_u$ according to an embodiment of the present invention;

FIG. 16 is a diagram illustrating the overall performance of the present distributed adversarial training (DAT) approach according to an embodiment of the present invention;

FIG. 17A is a diagram illustrating adversarial robustness against PGD perturbations with different perturbation sizes according to an embodiment of the present invention;

FIG. 17B is a diagram illustrating adversarial robustness against PGD perturbations with different steps according to an embodiment of the present invention;

FIG. 20 is a diagram illustrating the effect of gradient quantization on the performance of DAT for various numbers of bits according to an embodiment of the present invention;

FIG. 21 is a diagram illustrating a comparison to training over a high performance computing (HPC) cluster of nodes according to an embodiment of the present invention;

FIG. 22 is a diagram illustrating the effect of 8-bit quantization on centralized robust training Fast AT w/LALR according to an embodiment of the present invention;

DETAILED DESCRIPTION OF PREFERRED EMBODIMENTS

Figure 1:
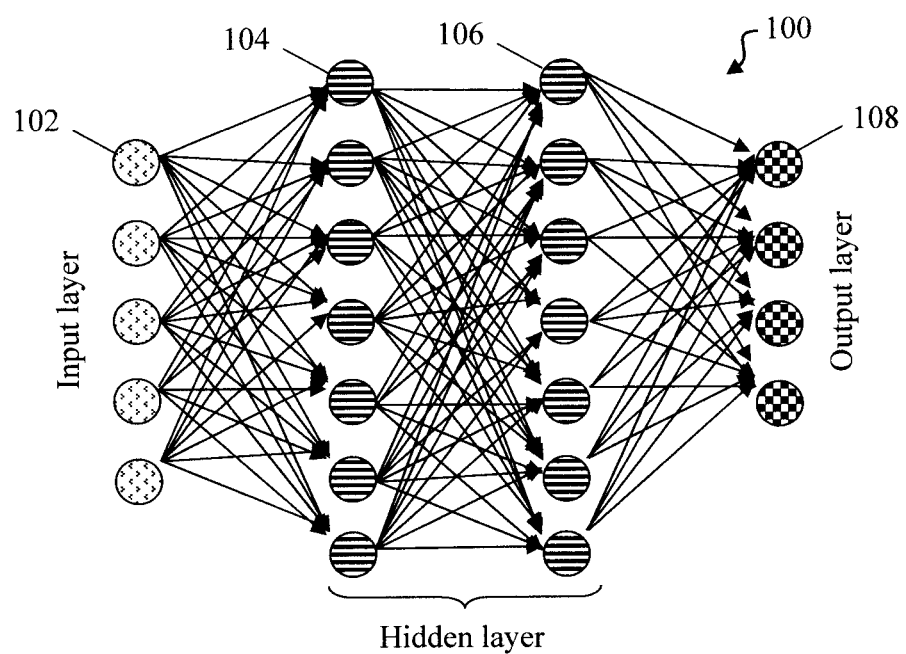
FIG. 1 is a schematic diagram illustrating an exemplary deep neural network according to an embodiment of the present invention.

As provided above, deep neural networks are vulnerable to adversarial perturbations, which can undesirably change or manipulate classification. Deep neural networks are often embodied as so-called "neuromorphic" systems of interconnected processor elements that act as simulated "neurons" that exchange "messages" between each other in the form of electronic signals. See, for example, FIG. 1 which provides a schematic illustration of an exemplary deep neural network 100. As shown in FIG. 1, deep neural network 100 includes a plurality of interconnected processor elements 102, 104/106 and 108 that form an input layer, at least one hidden layer, and an output layer, respectively, of the deep neural network 100. By way of example only, deep neural network 100 can be embodied in an analog cross-point array of resistive devices such as resistive processing unit (RPU) devices.

Similar to the so-called 'plasticity' of synaptic neurotransmitter connections that carry messages between biological neurons, the connections in a deep neural network that carry electronic messages between simulated neurons are provided with numeric weights that correspond to the strength or weakness of a given connection. The weights can be adjusted and tuned based on experience, making deep neural networks adaptive to inputs and capable of learning. For example, a deep neural network for image classification is defined by a set of input neurons (see, e.g., input layer 102 in deep neural network 100) which may be activated by the pixels of an input image. After being weighted and transformed by a function determined by the network's designer, the activations of these input neurons are then passed to other downstream neurons, which are often referred to as 'hidden' neurons (see, e.g., hidden layers 104 and 106 in deep neural network 100). This process is repeated until an output neuron is activated (see, e.g., output layer 108 in deep neural network 100). The activated output neuron makes a classification decision.

Instead of utilizing the traditional digital model of manipulating zeros and ones, deep neural networks such as deep neural network 100 create connections between processing elements that are substantially the functional equivalent of the core system functionality that is being estimated or approximated. For example, the IBM® SyNapse computer chip is the central component of an electronic neuromorphic machine that attempts to provide similar form, function and architecture to the mammalian brain. Although the IBM® SyNase computer chip uses the same basic transistor components as conventional computer chips, its transistors are configured to mimic the behavior of neurons and their synapse connections. The IBM® SyNapse computer chip processes information using a network of just over one million simulated "neurons," which communicate with one another using electrical spikes similar to the synaptic communications between biological neurons. The IBM® SyNapse architecture includes a configuration of processors (i.e., simulated "neurons") that read a memory (i.e., a simulated "synapse") and perform simple operations. The communications between these processors, which are typically located in different cores, are performed by on-chip network routers.

As also provided above, the process of adversarial training can be employed to mitigate the negative impact of adversarial perturbations using a min-max robust optimization-based training method that minimizes the worst-case training loss at adversarially perturbed examples. A min-max optimization-based training method is generally able to offer significant gains in robustness. Adversarial training, the first known min-max optimization-based defense, has inspired a wide range of other effective defenses such as adversarial logit pairing, input gradient or curvature regularization, trade-off between robustness and accuracy (TRADES), distributionally robust training, dynamic adversarial training, robust input attribution regularization, certifiably robust training, and semi-supervised robust training.

In particular, some recent approaches proposed fast but approximate adversarial training techniques, such as 'free' adversarial training, you only propagate once (YOPO), and fast gradient sign method (FGSM)-based adversarial training. These techniques speed up training by simplifying the inner maximization step (see below) of adversarial training. Although there is vast literature on min-max optimization based robust training, it is designed for centralized model training and without care about the scalability issue in AT. However, these adversarial training approaches are designed for centralized model training and are difficult to properly scale to large datasets.

While scaling adversarial training is important, doing so effectively is a non-trivial task. For instance, simply scaling adversarial training with the direct solution of distributing the data batch across multiple machines may not work and leaves many unanswered questions. First, if the direct solution does not allow for scaling batch size with machines (i.e., increasing batch size per machine), then it does not speed up the process and leads to a significant amount of communication costs (considering that the number of training iterations is not reduced over a fixed number of epochs (where 1 epoch equals the number of iterations required for going through the entire dataset). Second, without proper design, the direct application of a large batch size to distributed adversarial training introduces a significant loss in both normal accuracy and adversarial robustness. Third, the direct solution does not confer an effective algorithmic framework, which is needed in order to support different variants of adversarial training, large-batch optimization, and efficient communication.

Taking all of these factors into consideration, a question that naturally arises is whether adversarial training can be sped up by leveraging distributed learning with full utility of multiple computing nodes (machines), even when each machine has access to only limited processing resources? In contrast to centralized optimization, distributed learning enables increasing the batch size proportional to the number of computing nodes/machines. However, it is challenging to train a model via large-batch optimization without incurring accuracy loss compared to the standard training with a same number of epochs. To that point, the adaptation of learning rates to the increased batch size has been shown to boost the performance of large-batch optimization. A layer-wise adaptive learning rate strategy has also been shown to speed up the training as well as preserve the accuracy. Further, since distributed learning introduces machine-to-machine communication overhead, focus is also needed on the design of communication-efficient distributed optimization processes.

Advantageously, provided herein are principled and theoretically-grounded distributed (large-batch) adversarial training (DAT) techniques which make full use of the computing capability of multiple data-locality (distributed) machines, thereby expanding the capacity of data storage and computational scalability.

The present approach to distributed adversarial training provides some notable advantages. For instance, it supports multiple distributed variants of adversarial training, e.g., supervised adversarial training and semi-supervised adversarial training. It provides a principled algorithmic framework which, unlike conventional adversarial training, advantageously supports large-batch deep neural network training (without loss of performance over a fixed number of epochs) and allows the transmission of compressed gradients for efficient communication. The convergence speed of the present distributed adversarial training approach is theoretically quantified to the first-order stationary points in general non-convex settings at a rate of $O(1/\sqrt{T})$, where T is the total number of iterations. Advantageously, this result matches the standard convergence rate of classic training methods, such as stochastic gradient descent (SGD), for only the minimization problems. Further, it is demonstrated herein that the present distributed adversarial training not only speeds up training in large models on large datasets but also matches (and even exceeds) state-of-the-art robust accuracies. For example, performance of the present distributed adversarial training approach on a large image dataset with 6×6 (machines×graphics processing units (GPUs) per machine) yielded 38.45% robust accuracy (comparable to 40.38% from adversarial training) but only required 16.3 hours of training time (with a 6 times larger batch size allowed in distributed adversarial training), exhibiting 3.1 times faster performance than adversarial training on a single machine with 6 GPUs.

Figure 2:
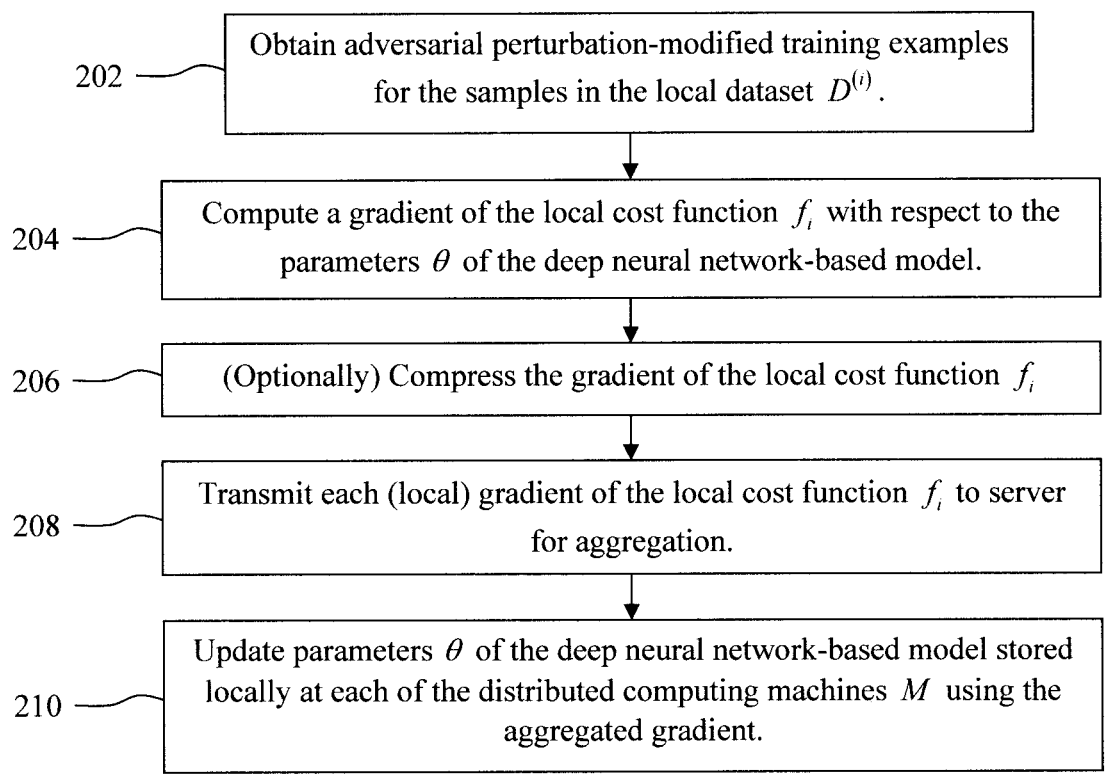
FIG. 2 is a diagram illustrating an exemplary methodology for adversarial training of a deep neural network-based model by distributed computing machines M according to an embodiment of the present invention.

Given the above overview, an exemplary methodology 200 for distributed adversarial training of a deep neural network-based model in accordance with the present techniques is now described by way of reference to FIG. 2. The present approach to distributed adversarial training involves the coordination of multiple distributed computing machines M, also referred to herein as 'distributed workers,' and a central server (or simply 'server'), which work collectively to distributely train the deep neural network. An apparatus that can be configured to serve as a distributed computing machine M and/or central server is described in conjunction with the description of FIG. 23, below.

As provided above, a deep neural network can be embodied in an analog cross-point array of resistive devices such as RPU devices. In that case, the RPU devices function as the weighted connections between neurons in the neural network. In general, neural network-based models are typically trained using an optimization technique. Namely, during training, the mapping from the input layer to the output layer (see, e.g., FIG. 1—described above) is learned from the training examples in order to determine the best weights of the neural network with the goal being to find the optimal weights of the neural network-based model in order to make the best predictions. A cost function is used to calculate error as the neural network-based model is trained. For instance, a neural network-based model is trained using an optimization technique, and backpropagation (compute gradient of loss function) is then used to update the weights of the neural network.

Adversarial training or AT is a min-max optimization method for training robust machine learning/deep learning models against adversarial examples. Formally, adversarial training solves the problem:

$$\underset{\theta}{\text{minimize}}\, \mathbb{E}_{(x,y)\in D}\left[\underset{\|\delta\|_\infty \le \epsilon}{\text{maximize}}\, \ell(\theta, x+\delta; y)\right], \quad (1)$$

wherein $\theta \in \mathbb{R}^d$ denotes the vector of model parameters, $\delta \in \mathbb{R}^n$ is the vector of input perturbations within an $\ell_\infty$ ball of the given radius $\epsilon$, namely, $\|\delta\|_\infty \le \epsilon$, $(x,y) \in D$ corresponds to the training example x with label y in the dataset D, and $\ell$ represents a pre-defined training loss, e.g., the cross-entropy loss. The rationale behind Equation 1 is that the model $\theta$ is robustly trained against the worst-case loss induced by the adversarially perturbed examples. It is worth noting that adversarial training problem in Equation 1 is different from conventional stochastic min-max optimization problems. Note that with the problem in Equation 1, the stochastic sampling corresponding to the expectation over $(x,y) \in D$ is conducted prior to the inner maximization operation. Such a difference leads to the sample-specific adversarial perturbation $$\delta(x) := \text{maximize}_{\|\delta\|_\infty \le \epsilon} \ell(\theta, x+\delta; y).$$

The need for adversarial training in a distributed setting arises from at least the following two aspects. First, training data are distributed, provided by multiple parties, which expands the individual capability of data storage. Second, computing units are often distributed, provided by distributed machines, which enables large-batch optimization and thus improves adversarial training scalability.

Consider, for example, a parameter-server model of distributed learning. Formally, there exist M distributed computing machines (i.e., distributed workers) each of which has access to a local dataset $D^{(i)}$, and thus $D = \cup_{i=1}^M D^{(i)}$. There also exists a server (e.g., one of the distributed workers could perform the role of the server), which collects local information (e.g., individual gradients of a local cost function) from the other distributed workers to update the parameters $\theta$ of a deep neural network-based model. Spurred by Equation 1, distributed adversarial training solves problems of the following generic form, $$\underset{\theta}{\text{minimize}}\, \frac{1}{M} \sum_{i=1}^M \underbrace{\left\{\lambda \mathbb{E}_{(x,y) \in D^{(i)}}[\ell(\theta; x, y)] + \mathbb{E}_{(x,y) \in D^{(i)}}\left[\underset{\|\delta\|_\infty \le \epsilon}{\text{maximize}}\, \phi(\theta, \delta; x, y)\right]\right\}}_{=: f_i(\theta; D^{(i)})}, \quad (2)$$

wherein $f_i$ denotes the local cost function at the ith distributed worker, $\phi$ is a robustness regularizer against the input perturbation $\delta$, and $\lambda \ge 0$ is a regularization parameter that strikes a balance between the training loss and the worst-case robustness regularization. In Equation 2, if M=1, $D^{(i)}$=D, $\lambda$=0 and $\phi = \ell$, then the distributed adversarial training problem reduces to the adversarial training problem in Equation 1. Two categories of Equation 2 are contemplated herein. One is distributed adversarial training with labeled data. In that case, in Equation 2, $\phi(\theta, \delta; x,y) = \ell(\theta, x+\delta; y)$ is considered with labeled training data $(x,y) \in D^{(i)}$ for $i \in [M]$, where [M] denotes the integer set $\{1, 2, \ldots, M\}$. Another is distributed adversarial training with unlabeled data. Different from distributed adversarial training with labeled data, in Equation 2, with unlabeled one has $D^{(i)}$ with an unlabeled dataset $U^{(i)}$ (namely, $U^{(i)} \subseteq D^{(i)}$), and the robust regularizer $\phi$ is defined as:

$$\phi(\theta,\delta;x) = CE(z(x+\delta;\theta), z(x;\theta)). \quad (3)$$

Here $z(x;\theta)$ represents the probability distribution over class labels predicted by the model $\theta$, and CE denotes the cross-entropy function.

In step 202 of methodology 200, each of the distributed computing machines M obtains adversarial perturbation-modified training examples for the samples in the local dataset $D^{(i)}$ from a maximization oracle. As provided above, the samples can include labeled or unlabeled data. Further, as will be described in detail below, the adversarial perturbation-modified training examples can be generated using multiple-step gradient ascent approach such as projected gradient descent (PGD) or a one-step fast gradient sign approach such as the one-shot fast gradient sign method (FGSM).

Using the adversarial perturbation-modified training examples obtained in step 202, in step 204 each distributed computing machine M then computes a (local) gradient of the local cost function $f_i$ (in Equation 2) with respect to the parameters $\theta$ of the deep neural network-based model stored locally on each distributed computing machine M. As provided above, the present techniques involve a distributedly trained deep neural network. By 'distributedly trained' it is meant that the deep neural network is trained by coordinated action of the distributed computing machines M and the server.

Optionally, in step 206 each distributed computing machine M compresses the gradient of the local cost function $f_i$ prior to transmission of the data to the server. According to an exemplary embodiment, the compression performed in step 206 involves quantization. Quantization is a technique often employed in image processing. With quantization, a range of values is compressed to a single quantum value.

Then, in step 208, each distributed computing machine M transmits the (optionally compressed) gradient of the local cost function $f_i$, computed in step 204, to the server. The server aggregates the gradients of the local cost function $f_i$ received from the individual distributed computing machines M (where 'aggregates' means to collect and compute the average of the local gradients). The server then transmits an aggregated gradient back to the distributed computing machines M. As above, the aggregated gradient can optionally be compressed/quantized prior to its transmittal to the distributed computing machines M.

The aggregated gradient is received by the distributed computing machines M, and in step 210 each distributed computing machine M updates the parameters θ of the deep neural network-based model stored locally at each of the distributed computing machines M using the aggregated gradient. By way of example only, updating the parameters θ of the neural network-based model can involve updating the weights of the neural network-based model with respect to the computed gradient of the loss function. As will be described in detail below, according to an exemplary embodiment, the parameters θ of the deep neural network-based model (stored locally) are updated using a layer-wise adaptive learning rate approach. As provided above, one of the distributed workers could perform the role of the server. In that case, in step 210 the server also uses the aggregated gradient to update the parameters θ of the deep neural network-based model stored locally at the server.

Figure 3:
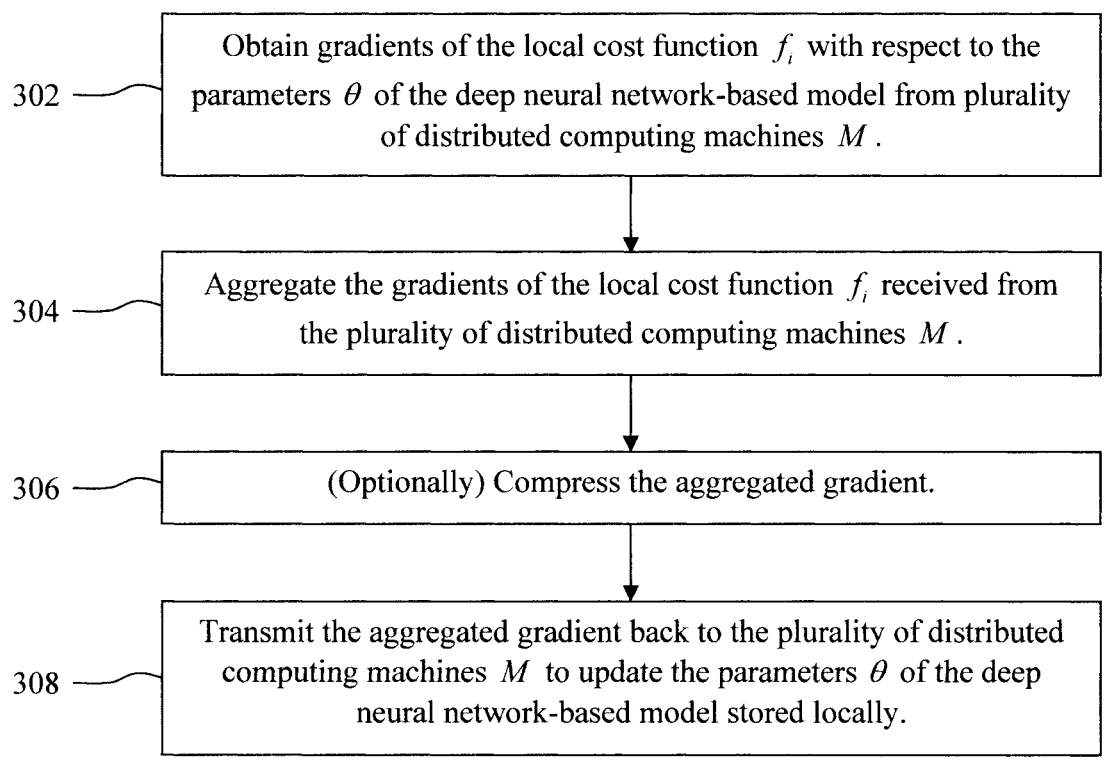
FIG. 3 is a diagram illustrating an exemplary methodology for distributed adversarial training of a deep neural network-based model by a server according to an embodiment of the present invention.

As is apparent from the description above, methodology 200 addresses the present approach to distributed adversarial training from the role of the distributed computing machines M. Namely, one of more steps of methodology 200 are performed by the distributed computing machines M. Referring to FIG. 3, distributed adversarial training of a deep neural network-based model in accordance with the present techniques from the perspective of the server is now described by way of reference to methodology 300. Namely, one of more steps of methodology 300 are performed by the server which, as provided above, can be a given one of the distributed computing machines M.

In step 302, the server obtains the gradients of the local cost function $f_i$ from the distributed computing machines M. As described above, the gradients of the local cost function $f_i$ are computed by each of the distributed computing machines M using adversarial perturbation-modified training examples for samples in a local dataset $D^{(i)}$. As also described above, these adversarial perturbation-modified training examples can be generated using multiple-step gradient ascent approach such as PGD or a one-step fast gradient sign approach such as FGSM.

In step 304, the server aggregates the gradients of the local cost function $f_i$ it has received from the distributed computing machines M. Optionally, in step 306 the server compresses the aggregated gradient prior to transmitting of the data back to the distributed computing machines M. According to an exemplary embodiment, the compression performed in step 306 involves quantization.

In step 308, the server then transmits the (optionally quantized) aggregated gradient back to the distributed computing machines M for them to update the parameters θ of the deep neural network-based model stored locally at each of the plurality of distributed computing machines M. By way of example only, updating the parameters θ of the neural network-based model can involve updating the weights of the neural network-based model with respect to the computed gradient of the loss function. As provided above, one of the distributed workers could perform the role of the server. In that case, the server also uses the aggregated gradient to update the parameters θ of the deep neural network-based model stored locally at the server.

An exemplary implementation of the techniques described in conjunction with the description of methodology 200 of FIG. 2 and methodology 300 of FIG. 3 above is now described by way of reference to methodology 400 shown in FIG. 4. It is notable that methodology 400 is a meta-form of the distributed adversarial training Algorithm A1 (described in conjunction with the description of FIG. 11, below) and reference will be made to Algorithm A1 in the description that follows. Methodology 400 contains three algorithmic blocks. In the first block (Block 1 which corresponds to steps 3-8 of Algorithm A1—see below), every distributed worker (i.e., every distributed computing machine M) calls for a maximization oracle to obtain the adversarial perturbation, i.e., adversarial perturbation-modified training examples, for each sample within a data batch, then computes the gradient of the local cost function $f_i$ in Equation 2 with respect to (w.r.t.) the model parameters θ. As described above, every worker is allowed to quantize/compress the local gradient prior to transmission to a server. In the second block (Block 2 which corresponds to steps 9-10 of Algorithm A1—see below), the server aggregates the local gradients, and transmits the aggregated gradient (or the optionally quantized gradient) to the other workers. In the third block (Block 3 which corresponds to steps 11-13 of Algorithm A1—see below), the model parameters are eventually updated by a minimization oracle at each worker based on the received gradient information from the server.

In contrast to standard adversarial training, distributed adversarial training allows for using an M times larger batch size to update the model parameters θ. Thus, given the same number of epochs, distributed adversarial training takes M fewer gradient updates than adversarial training. In addition, distributed learning introduces communication overhead. To address this issue, as described above it is optional to perform gradient quantization at both worker and server sides when a very large model is possibly trained.

Regarding inner maximization, as described above, the present distributed adversarial training process begins with each distributed computing machine M (worker) calling for an inner maximization oracle to generate adversarial perturbations (see step 202 of methodology 200; step 1 of methodology 400). By way of example only, these adversarial perturbations can be generated using a multiple-step gradient ascent approach or a one-step fast gradient sign approach. Namely, according to an exemplary embodiment, two solvers of perturbation generation are employed: an iterative projected gradient descent (PGD) method as used in standard adversarial training and a one-shot fast gradient sign method (FGSM). Perturbation generation is specified in the unified form:

$$\delta_i^{(i)}(x) = z_K, z_k = \prod_{[-\epsilon,\epsilon]^d} [z_{k-1} + \alpha \cdot \text{sign}(\nabla_{\delta\phi}(\theta_t, z_{k-1}; x))], k \in [K], \quad (4)$$

wherein K is the total number of iterations in the inner loop, the cases of K=1 and K>1 correspond to iterative PGD and FGSM perturbations respectively, $z_k$ denotes the PGD update of δ at the k th iteration, $z_0$ is a given initial point, $$\prod_{[-\epsilon,\epsilon]^d}$$

(•) denotes we projection onto the box constraint $[-\epsilon,\epsilon]^d$, α>0 is a given step size, and sign(•) denotes the element-wise sign operation. A recent work has shown that if FGSM is conducted with random initialization $z_0$ and a proper step size, e.g., $\alpha=1.25\epsilon$, then FGSM can be as effective as iterative PGD in robust training. See, for example, Wong et al., "Fast is better than free: revisiting adversarial training," arXiv:2001.03994v1 (January 2020) (17 pages) (hereinafter "Wong"). Indeed, as will be shown below, the effectiveness of the present distributed adversarial training-FGSM approach echoes the findings in Wong. It is notable that, while other techniques can also be used to simplify inner maximization, focus here is on FGSM since it is the most computationally-light.

Regarding gradient quantization, in contrast to standard adversarial training, distributed adversarial training requires distributed computing machine M (worker)-server communications (see step 208 of methodology 200; step 308 of methodology 300). That is, if a single-precision floating-point data type is used, then distributed adversarial training needs to transmit 32d bits per worker-server communication at each iteration. Here recall that d is the dimension of θ. In order to reduce the communication cost, distributed adversarial training has the option to quantize the transmitted gradients using a fixed number of bits fewer than 32. The gradient quantization operation is specified as the randomized quantizer. As will be described in detail below, distributed adversarial training combined with gradient quantization leads to a competitive performance. It is also worth mentioning that the All-reduce communication protocol can be regarded as a special case of the parameter-server setting considered in methodology 400 when every worker performs as a server. In this case, the communication network becomes fully connected and the server-worker quantization (see step 308 of methodology 300; step 8 of methodology 400) can be mitigated.

Regarding outer minimization, in distributed adversarial training the aggregated gradient (see step 304 of methodology 300; step 7 in methodology 400) used for updating model parameters (see step 210 of methodology 200; step 10 in methodology 400) is built on the data batch that is M times larger than standard adversarial training. According to an exemplary embodiment, layerwise adaptive learning rate (LALR), which performs well with large data batch training, is incorporated in the present distributed adversarial training process. Specifically, the parameter updating operation $\mathcal{A}$ in Equation A4 (see below) is given by $$\theta_{t+1,i} = \theta_{t,i} - \frac{\tau(\|\theta_{t,i}\|_2)}{\|\theta_{t,i}\|_2} \cdot u_{t,i}, \quad \forall i \in [h], \tag{5}$$

wherein $\theta_{ij}$ denotes the ith-layer parameters, h is the number of layers, $u_t$ is a descent direction computed based on the first-order information $Q(\hat{g}_t)$, $t(\|\theta_{t,i}\|2) = \min\{\max\{\|\theta_{t,i}\|2, c_l\}, c_u\}$ is a layerwise scaling factor of the adaptive learning rate $$\frac{\eta_t}{\|u_{t,i}\|_2},$$

$c_l=0$ and $c_u=10$ are set in the present experiments (see below for results on tuning $c_u$), and $\theta_t=[\theta_{t,1}^T, \ldots, \theta_{t,h}^T]^T$. In Equation 5, the specific form of the descent direction $u_t$ is determined by the optimizer employed. For example, if the adaptive momentum (Adam) method is used, then $u_t$ is given by the exponential moving average of past gradients scaled by the square root of exponential moving averages of squared past gradients. Such a variant of Equation 5 that uses adaptive momentum as the base algorithm is also known as LAMB in standard training. See, for example, You et al., "Large Batch Optimization for Deep Learning: Training BERT in 76 Minutes," arXiv:1904.00962v5 (Jan. 2, 2020) (37 pages) (hereinafter "You"). However, it was elusive if the advantage of LALR is preserved in large-batch min-max optimization. Here it is shown, both in theory and in practice, that the use of LALR can significantly boost the performance of distributed adversarial training with a large data batch.

A convergence analysis of distributed adversarial training is now provided. Distributed adversarial training needs to quantify the descent errors from multiple sources (namely, gradient estimation, quantization, adaptive learning rate, and inner maximization oracle). In particular, the incorporation of LALR makes the present analysis of distributed adversarial training highly non-trivial. Namely, the fundamental challenge lies in the nonlinear coupling between the biased gradient estimate resulting from LALR and the additional error generated from alternating updates in adversarial training. As will be shown and described below, even in the case where the gradient estimate is a function of the adversarial training variables, the estimate bias resulting from the layer-wise normalization can still be compensated by increasing the batch-size so that the convergence rate of distributed adversarial training achieves a linear speedup of reducing gradient estimate error with respect to the increasing number of computing nodes.

Upon defining $$\Psi(\theta) := \frac{1}{M}\sum_{i=1}^{M} fi(\theta; D^{(i)})$$

in Equation 2, the convergence of distributed adversarial training is measured by the first-order stationarity of Ψ. Prior to convergence analysis, the following assumptions are imposed: (Assumption 1) Ψ(θ) is with layer-wise Lipschitz continuous gradients; (Assumption 2) $\phi(\theta,\delta;x)$ in Equation A1 (see below) is strongly concave with respect to δ and with Lipschitz continuous gradients; (Assumption 3) stochastic gradient estimate in Equation A2 (see below) is unbiased and has bounded variance for each worker denoted by $\sigma^2$. It is notable that the validity of Assumption 2 could be justified from distributional robust optimization. It is also needed for tractability of analysis. Further justifications for the Assumptions 1-3 are provided below. In Theorem 1 that follows, the sub-linear rate of distributed adversarial training is presented.

In accordance with Theorem 1, suppose that Assumptions 1-3 hold, then the inner maximizer Equation A1 (see below) provides a ε-approximate solution (i.e., the $\ell_2$-norm of inner gradient is upper bounded by ε), and the learning rate is set by $\eta^t \sim \mathcal{O}(1/\sqrt{T})$, then $\{\theta_t\}_{t=1}^T$ generated by distributed adversarial training yields the following convergence rate:

$$\frac{1}{T}\sum_{t=1}^{T} \mathbb{E}\|\nabla_\theta \Psi(\theta_t)\|_2^2 = \mathcal{O}\left(\frac{1}{\sqrt{T}} + \frac{\sigma}{\sqrt{MB}} + \min\left\{\frac{d}{4^b}, \frac{\sqrt{d}}{2^b}\right\} + \varepsilon\right), \tag{6}$$

wherein b denotes the number of quantization bits, and $B = \min\{\mathcal{B}_{t}^{(i)}|\}, \forall t,i\}$ stands for the smallest batch size per worker.

The error rate given by Equation 6 involves four terms. The term $\mathcal{O}(1/\sqrt{MB})$ characterizes the benefit of using the large per-worker batch size B and M computing nodes in distributed adversarial training. It is introduced since the variance of adaptive gradients (i.e., $\theta^2$) is reduced by a factor 1/MB, where 1/M corresponds to the linear speedup by M machines. In Equation 6, the term $$\min\left\{\frac{d}{4^b}, \frac{\sqrt{d}}{2^b}\right\}$$

arises due to the variance of compressed gradients, and the other two terms imply the dependence on the number of iterations T as well as the ε-accuracy of the inner maximization oracle. It is notable that the present convergence analysis (Theorem 1) is not merely a combination of LALR-enabled standard training analysis and adversarial training convergence analysis. Namely, by comparison from previous works, the present techniques address the fundamental challenges in (a) quantifying the descent property of the objective value at the presence of multi-source errors during alternating min-max optimization, and (b) deriving the theoretical relationship between large data batch (across distributed machines) and the eventual convergence error of distributed adversarial training.

The following examples illustrate the effectiveness of the present distributed adversarial training for robust image classification. Namely, in this section, distributed adversarial training is empirically evaluated and its success in training robust deep neural networks over image datasets is shown. The performance of distributed adversarial training is measured in the following four aspects: a) accuracies against clean and adversarial test inputs, b) scalability to multiple computing nodes, c) incorporation of unlabeled data, and d) transferability of pre-trained model by distributed adversarial training.

In the following examples, the deep-neural network (DNN)-based models for image classification as described in He et al., "Identity Mappings in Deep Residual Networks," arXiv:1603.05027v3 (July 2016) (15 pages) and in He et al., "Deep Residual Learning for Image Recognition," arXiv:1512.03385v1 (December 2015) (12 pages) (hereinafter "DNN model 1" and "DNN model 2," respectively) were used. These models were trained under the image datasets: Dataset 1 containing 60,000 images in 10 classes with 6,000 images per class (including 50,000 training images and 10,000 test images) and Dataset 2 containing more than 14 million images in 20,000 classes, but DNN model 1 was preserved for Dataset 1 only. When studying transferability of the pre-trained model, a Dataset 3 was used as a target dataset for down-stream classification. Dataset 3 contained 60,000 images in 100 classes with 600 images per class (including 500 training images and 100 test images per class).

The deep neural network-based models were trained using p computing nodes, each of which contained q graphic processing units (GPUs). The computing nodes were connected with 1 Gigabits per second (Gbps) ethernet. A configuration of computing resources is noted by p×q. If p>1, then the training is conducted in a distributed manner. Training data is then split into p subsets, each of which is stored at a local node. In the Dataset 1 and Dataset 3 experiments, p∈{1,6,18,24} machines were considered, each of which has 1 GPU. In the Dataset 2 experiments p∈{1,6} machines were considered, each of which has 6 GPUs, were considered.

Regarding the training setting, two variants of distributed adversarial training were considered: 1) distributed adversarial training-PGD (DAT-PGD), namely, Algorithm A1 (see below) with the application of (iterative) PGD as the inner maximization oracle; and 2) distributed adversarial training-FGSM (DAT-FGSM), namely, Algorithm A1 (see below) with the use of FGSM as the inner maximization oracle. Additionally, four training baselines were considered: 1) adversarial training (AT); 2) Fast adversarial training (Fast AT); 3) distributed adversarial training w/o LALR (DAT w/o LALR), namely, a direct distributed implementation of adversarial training, which is in the form of DAT-PGD or DAT-FGSM but without considering LALR; and 4) distributed adversarial training-LSGD (DAT-LSGD), namely, a distributed implementation of large-batch SGD (LSGD) for standard adversarial training. Both AT and Fast AT are centralized training methods. In the present training setup, the number of GPUs was limited to 6 at a single machine, and thus the largest batch size that the centralized method can use is around 2048 for Dataset 1 and 85 for Dataset 2. It was found that the direct implementation of Fast-AT in a distributed way leads to a quite poor scalability versus the growth of batch size, and thus a worse distributed baseline than DAT-FGSM w/o LALR. Further, the works on LSGD have proposed modifying a model architecture by incorporating feature denoising. By contrast, distributed adversarial training does not call for architecture modification. Thus, to enable a fair comparison, the same training recipe as LSGD was used in the distributed adversarial training setting, leading to the considered distributed training baseline DAT-LSGD.

Unless specified otherwise, the training perturbation size ε=8/255 was chosen for Datasets 1 and 3, and training perturbation size ε=2/255 was chosen for Dataset 2 (recall that ε was defined in Equation 1 above). Also chosen were 10 steps and 4 steps for PGD perturbation generation in distributed adversarial training (and its variants) under Datasets 1/Dataset 3 and Dataset 2, respectively. The number of training epochs is given by 100 for Dataset 1 and 30 for Dataset 2. It is notable that the adversarially robust deep learning could be sensitive to the step size (learning rate) choice. For example, the use of a cyclic learning rate trick can further accelerate the Fast AT algorithm. However, such a trick becomes less effective when the batch size becomes larger (namely, the number of iterations gets smaller). See below. Meanwhile, the sensitivity of adversarially model training to step size can be mitigated by using early-stop remedy due to the existence of robust overfitting. Spurred by that, the standard piecewise decay step size and an early-stop strategy are used during robust training.

For adversarial evaluation, robust test accuracy (RA) of a learned model against PGD perturbations and Carlini & Wagner (C&W) perturbation is used. See, for example, Carlini et al., "Towards Evaluating the Robustness of Neural Networks," arXiv:1608.04644v2 (March 2017) (19 pages). Unless specified otherwise, the same perturbation size was chosen as the training ε in evaluation, and the number of PGD steps is selected as 20 and 10 for Dataset 1/Dataset 3 and Dataset 2, respectively. In addition to RA, the standard test accuracy (TA) of a model against normal examples was also measured. All experiments were run three times with different random seeds. In these experiments, three different communication protocols were considered, Ring-AliReduce (with one-sided quantization), parameter-server (with double quantization), and high performance computing (HPC) setting (without quantization). To measure the communication time, a communication package in pytorch was used. The time of required worker-server communications per epoch was then measured. A time module was used to measure communication time with the communication package to synchronize all processes on each node.

Table 500 shown in FIG. 5 illustrates the overall performance of the present distributed adversarial training approach (in gray color) compared with baselines, in TA (%), RA (%), communication time per epoch (seconds), and total training time (including communication time) per epoch (seconds). For brevity, 'p×q' represents '# nodes×# GPUs per node', 'Comm.' represents communication cost, and 'Tr. Time' represents training time. It is notable that AT and Fast AT are centralized training methods in single node under the same number of epochs as distributed training.

Figure 6A:
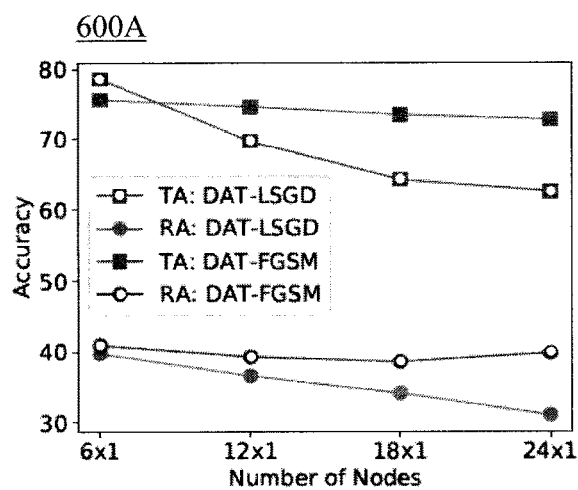
FIG. 6A is a diagram illustrating a test accuracy (TA)/robust test accuracy (RA) comparison between distributed adversarial training (DAT)-one-shot fast gradient sign method (FGSM) and DAT-large-batch SGD (LSGD) versus node-GPU configurations according to an embodiment of the present invention.
Figure 6B:
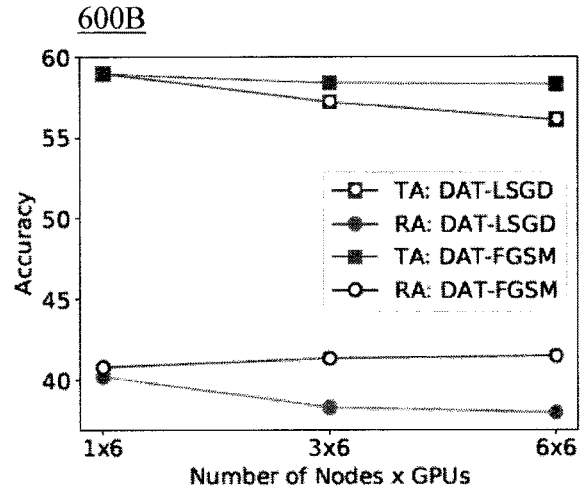
FIG. 6B is another diagram illustrating a TA/RA comparison between DAT-FGSM and DAT-LSGD versus node-GPU configurations according to an embodiment of the present invention.

It was observed that the direct extension from AT to distributed adversarial training (namely, DAT-PGD w/o LALR) leads to significantly poor TA and RA. As the 18 times larger batch size is used, DAT-PGD w/o LALR yields more than 25% drop in TA and 10% drop in RA compared to the best AT case. It was found that that the performance of DAT-PGD w/o LALR rapidly degrades as the number of computing nodes increases. The similar conclusion holds for DAT-FGSM w/o LALR versus Fast AT. Furthermore, it was observed that DAT-PGD outperforms DAT-LSGD with 16:13% and 4:32% improvement in TA and RA, respectively. A further comparison of the present distributed adversarial training approach with the DAT-LSGD baseline in terms of TA/RA versus the number of computing nodes is shown in plots 600A and 600B of FIGS. 6A and 6B, respectively. Namely, plots 600A and 600B of FIGS. 6A and 6B depict a TA/RA comparison between DAT-FGSM and DAT-LSGD versus node-GPU configurations for Dataset 1/DNN model 1 and Dataset 2/DNN model 2, respectively. Clearly, the present approach scales better than the baseline (without losing much performance as the batch sizes increases along the number of computing nodes).

Moreover, it was observed that DAT-PGD (or DAT-FGSM) is able to achieve competitive performance to AT (or Fast AT) and enables a graceful training speedup, e.g., by 3 times using 6 machines for Dataset 2. In practice, distributed adversarial training is not able to achieve linear speed-up mainly because of the communication cost. For example, when comparing the computation time of DAT-PGD (batch size 6×512) with that of AT (batch size 512) under Dataset 2, the computation speed-up (by excluding the communication cost) is given by (6022)/(1960–898)=5.67, consistent with the ideal computation gain using 6× larger batch size in DAT-PGD. Furthermore, it was observed that when the largest batch size (24×2048) is used, DAT-FGSM takes only (500 seconds) to obtain satisfactory robustness.

When comparing DAT-FGSM with DAT-PGD, it was observed that the former is capable of offering satisfactory (and even better) RA, but inevitably introduces a TA loss. This phenomenon also holds for Fast AT versus AT, e.g., 0:4% RA improvement versus 3:71% TA degradation for Dataset 2. It is also notable that the per-epoch communication time decreases when the more GPU machines (24) are used, since a larger batch size allows for a smaller number of iterations per epoch, leading to less frequent communications among machines. Additional results on Dataset 1 using DNN model 2 are described below.

Figure 7A:
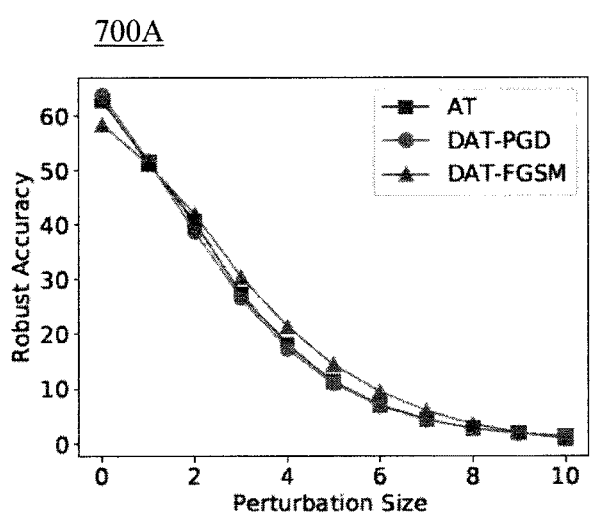
FIG. 7A is a diagram illustrating RA against projected gradient descent (PGD) perturbations for model trained by DAT-PGD, DAT-FGSM, and adversarial training (AT) versus different perturbation sizes according to an embodiment of the present invention.
Figure 7B:
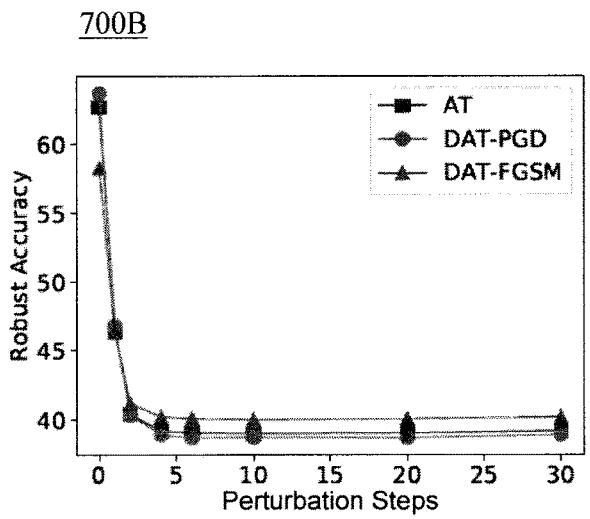
FIG. 7B is a diagram illustrating RA against PGD perturbations for model trained by DAT-PGD, DAT-FGSM, and AT versus different steps according to an embodiment of the present invention.

Regarding robustness against different PGD perturbation, plots 700A and 700B of FIGS. 7A and 7B, respectively, evaluate the adversarial robustness of DNN model 2 at Dataset 2 learned by DAT-PGD and DAT-FGSM against PGD perturbations of different steps and perturbation sizes (i.e., values of 6). Namely, plots 700A and 700B of FIGS. 7A and 7B depict RA against PGD perturbations for model trained by DAT-PGD, DAT-FGSM, and AT following (Dataset 2, DNN model 2) in table 500 of FIG. 5 (described above), i.e., RA versus different perturbation sizes (over the divisor 255) and RA versus different steps, respectively. It was observed that DAT matches robust accuracies of standard AT even against PGD perturbations at different values of $\epsilon$ and steps. It was also noted that, although DAT-FGSM has the worst TA ($\epsilon$=0), it yields slightly better robustness as perturbation steps increase. A similar result was found for (Dataset 1, DNN model 1) against PGD (and C&W) perturbations. See below.

Figures 8, 9:
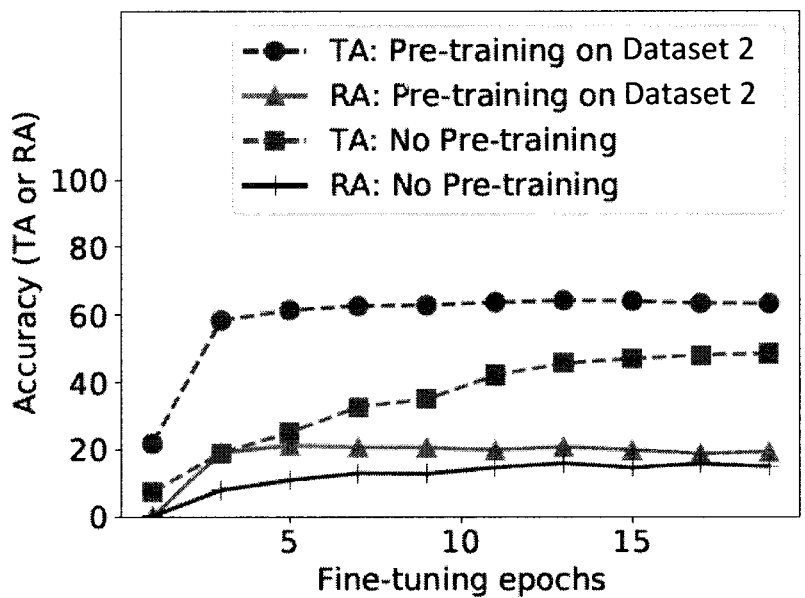
FIG. 8 is a diagram illustrating the TA and RA of distributed adversarial training (DAT) in the semi-supervised setting with the use of 500K unlabeled images according to an embodiment of the present invention.
FIG. 9 is a diagram illustrating fine-tuning of a pre-trained deep neural network-based model according to an embodiment of the present invention.

For distributed adversarial training under unlabeled data, table 800 shown in FIG. 8 illustrates the TA and RA of distributed adversarial training in the semi-supervised setting with the use of 500K unlabeled images. Compared to the distributed adversarial training supervised learning results at (Dataset 1, DNN model 1) in table 500 of FIG. 5 (described above), it was observed that, although the communication and computation costs increase due to the use of additional unlabeled images, both TA and RA are significantly improved. In particular, the performance of DAT-FGSM matches that of DAT-PGD. This suggests that unlabeled data might provide a solution to compensate the TA loss induced by FGSM-based robust training algorithms. Here the computing resource configuration and batch size are set the same as the 8th and 10th rows of (Dataset 1, DNN model 1) in table 500 of FIG. 5 (described above). The relative improvement over RA or TA obtained in supervised learning (Dataset 1 only) is marked in bold.

FIG. 9 is a plot 900 illustrating how a distributed adversarial training pre-trained model (DNN model 2) over a source dataset (Dataset 2) can offer a fast fine-tuning to a down-stream target dataset (Dataset 3). DAT-PGD is used for both pre-training and finetuning at 6 nodes with batch size 6×128. Here, a Dataset 1 image is up-sampled to the same dimension of a Dataset 2 image before feeding it into the pre-trained model. See, for example, Shafahi et al., "Adversarially Robust Transfer Learning," arXiv: 1905.08232v2 (February 2020) (14 pages). Compared with the direct application of distributed adversarial training to the target dataset (without pretraining), the pre-training enables a fast adaption to the down-stream Dataset 3 task in both TA and RA within just three epochs. Thus, the scalability of distributed adversarial training to large datasets and multiple nodes offers a great potential in the pre-training+fine-tuning paradigm. Similar results can be found on Dataset 1-see below.

As will be described in further detail below, the effect of gradient quantization on the performance of distributed adversarial training was also evaluated. It was found that when the number of bits is reduced from 32 to 8, the resulting TA and RA becomes worse than the best 32-bit case. For example, in the worst case (8-bit 2-sided quantization) of Dataset 1, TA drops 1:52% and 6:32% for DAT-PGD and DAT-FGSM, respectively. And RA drops 4:74% and 5:58%, respectively. It is notable that the main communication configuration is given by Ring-AllReduce that calls for 1-sided (rather than 2-sided) quantization. It was also observed that DAT-FGSM is more sensitive to effect of gradient quantization than DAT-PGD. Even in the centralized setting, the use of 8-bit quantization can lead to a non-trivial drop in TA (see below). However, the use of quantization reduces the amount of data transmission per iteration. It was also shown that if a high performance computing cluster of nodes (with NVLink high-speed GPU interconnect is used, the communication cost can be further reduced.

The effect of LALR on both centralized and distributed robust training methods given a batch size that is affordable to a single machine was also examined. A variant of AT incorporating LALR, termed as AT w/ LALR, was considered. See, e.g., table 1000 in FIG. 10 which illustrates the effect of LALR on centralized and distributed training under Dataset 1 with same batch size (2048). As shown in table 1000, when the batch size is not large, both centralized and distributed methods lead to very similar performance, although the former is slightly better as it is free of machine synchronization and communication. And the performance is not sensitive to LALR. By contrast, if the batch size is large (inapplicable to centralized cases as table 500 of FIG. 5—described above), then DAT+LALR outperforms DAT (namely, LALR matters).

As highlighted above, Algorithm A1 provides a detailed implementation of the present distributed adversarial training approach. See FIG. 11. As shown in FIG. 11, in steps 3-8 of Algorithm A1, every distributed computing machine M (worker) calls for a maximization oracle to obtain adversarial perturbation-modified training examples for each sample within a data batch $\mathcal{B}^i \subseteq D^{(i)}$, then computes the gradient of the local cost function $f_i$ in Equation 2 with respect to (w.r.t.) the model parameters θ. As described above, every worker is allowed to quantize/compress the local gradient prior to transmission to a server. In steps 9-10 of Algorithm A1, the server aggregates the local gradients, and transmits the aggregated gradient (or the optionally quantized gradient) to the other workers. In steps 11-13 of Algorithm A1, the model parameters are eventually updated by a minimization oracle at each worker based on the received gradient information from the server.

Namely, as per steps 3-8 of Algorithm A1, a finite-size data batch $\mathcal{B} \subseteq D^{(i)}$ is drawn and, for each data sample $x \in \mathcal{B}$, each distributed computing machine M (worker) calls for an inner maximization oracle:

$$\delta_t^{(i)}(x) := \underset{\|\delta\|_\infty \leq \epsilon}{\mathrm{argmax}}\, \phi(\theta_t, \delta; x), \tag{A1}$$

wherein the label or possible pseudo-label y of x is omitted for brevity. The local gradient of $f_i$ in Equation 2 is computed with respect to θ given perturbed samples:

$$g_t^{(i)} = \lambda \mathbb{E}_{x \in \mathcal{B}^{(i)}}[\nabla_\theta \ell(\theta_t; x)] + \mathbb{E}_{x \in \mathcal{B}^{(i)}}[\nabla_\theta \phi(\theta_t; x + \delta_t^{(i)}(x))] \tag{A2}$$

Optionally, each distributed computing machine M (worker) can call for a gradient quantizer Q(•) and then transmit (quantized) $Q(g_t^{(i)})$ to the server.

As per steps 9-10 of Algorithm A1, gradient aggregation is performed at the server:

$$\hat{g}_t = \frac{1}{M} \sum_{i=1}^{M} Q(g_t^{(i)}). \tag{A3}$$

Optionally, the server can call for a gradient quantizer $\hat{g}_t \leftarrow Q(\hat{g}_t)$, and then transmits $\hat{g}_t$ to the distributed computing machines M (workers).

As per steps 11-13 of Algorithm A1, each distributed computing machine M (worker) calls for an outer minimization oracle $\mathcal{A}(\bullet)$ to update θ:

$$\theta_{t+1} = \mathcal{A}(\theta_t, \hat{g}_t, \eta_t). \tag{A4}$$

In Equation A4, $\eta_t$ is the learning rate.

Additional details on gradient quantization are now provided. See, for example, step 206 of methodology 200; step 306 of methodology 300; steps 5 and 8 of methodology 400; steps 7 and 10 of Algorithm A1. Let b denote the number of bits (b≤32), thus there exists $s=2^b$ quantization levels. The gradient quantization operation Q(•) in Algorithm A1 is specified as the randomized quantizer. Formally, the quantization operation at the ith coordinate of a vector g is given by:

$$Q(g_i) = \|g\|_2 \cdot \mathrm{sign}(g_i) \cdot \xi_i(g_i, s), \forall i \in \{1, 2, \ldots d\}. \tag{A5}$$

See, for example, Alistarh et al., "QSGD: Communication-Efficient SGD via Gradient Quantization and Encoding," arXiv:1610.02132v4 (December 2017) (28 pages) (hereinafter "Alistarh"). In Equation A5, $\xi_i(g_i, s)$ is a random number drawn as follows. Given $|g_i|/\|g\|_2 \in [l/s, (l+1)/s]$ for some $l \in \mathbb{N}^+$ and $0 \leq l < s$, then:

$$\xi_i(g_i, s) = \begin{cases} l/s & \text{with probability } 1 - (s|g_i|/\|g\|_2 - l) \\ (l+1)/s & \text{with probability } (s|g_i|/\|g\|_2 - l) \end{cases}, \tag{A6}$$

wherein |a| denotes the absolute value of a scalar a, and $\|a\|_2$ denotes the $\ell_2$ norm of a vector a. The rationale behind using Equation A5 is that $Q(g_i)$ is an unbiased estimate of $g_i$, namely, $\mathbb{E}_{\xi_i(g_i, s)}[Q(g_i)] = g_i$, with bounded variance. Moreover, at most (32+d+bd) bits are needed to transmit the quantized Q(g), where 32 bits for $\|g\|_2$, 1 bit for sign of g, and b bits for $\xi_i(g_i, s)$, whereas it needs 32d bits for a single-precision g. Clearly, a small b saves the communication cost. It is notable that if every distributed computing machines (worker) performs as a server in distributed adversarial training, then the quantization operation at step 10 of Algorithm A1 is no longer needed. In this case, the communication network becomes fully connected. With synchronized communication, this is favored for training deep neural networks under the All-reduce operation.

A discussion of theoretical results is now provided. In this section, the convergence behavior of the present distributed adversarial training approach is quantified. First, the following notations are defined:

$$\Phi_i(\theta, x) = \max_{\|\delta^{(i)}\|_\infty \leq \epsilon} \phi(\theta, \delta^{(i)}; x), \text{ and } \Phi(\theta) = \mathbb{E}_{x \in D^{(i)}} \Phi_i(\theta; x). \tag{A7}$$

Also defined is:

$$l_i(\theta) = \mathbb{E}_{x \in D^{(i)}} l(\theta; x), \tag{A8}$$

wherein the label y of x is omitted for labeled data. Then, the objective function of Equation 2 can be expressed in the compact way:

$$\Psi(\theta) = \frac{1}{M} \sum_{i=1}^{M} \lambda l_i(\theta) + \Phi_i(\theta) \tag{A9}$$

and the optimization problem is then given by $\min_\theta \Psi(\theta)$. Therefore, it is clear that if a point θ* satisfies $$\|\nabla_\theta \Psi(\theta^*)\| \leq \xi, \tag{A10}$$

then it can be said that θ* is a ξ approximate first-order stationary point (FOSP) of the problem in Equation 2.

Prior to delving into the convergence analysis of distributed adversarial training, the following assumptions are made. With Assumption 1, as highlighted above, it is assumed that the objective function has layer-wise Lipschitz continuous gradients with constant $L_i$ for each layer, $$\|\nabla_i \Psi(\theta \bullet, i) - \nabla_i \Psi(\theta' \bullet, i)\| \leq L_i \|\theta \bullet, i - \theta' \bullet, i\|, \forall i \in [h], \quad (A11)$$

wherein $\nabla_i \Psi(\theta \bullet, i)$ denotes the gradient w.r.t. the variables at the ith layer. Also, it is assumed that $\Psi(\theta)$ is lower bounded, i.e., $\Psi^* := \min_\theta \Psi(\theta) > -\infty$ and bounded gradient estimate, i.e., $\|\nabla \hat{g}_t^{(i)}\| \leq G$.

With Assumption 2, as highlighted above, it is assumed that $\phi(\theta, \delta; x)$ is strongly concave with respect to $\delta$ with parameter $\mu$ and has the following gradient Lipschitz continuity with constant $L_\phi$:

$$\|\nabla_\theta \phi((\theta, \delta; x) - \nabla_\theta \phi(\theta, \delta'; x)\| \leq L_\phi \|\delta - \delta'\|. \quad (A12)$$

With Assumption 3, as highlighted above, it is assumed that the gradient estimate is unbiased and has bounded variance, i.e., $$\mathbb{E}_{x \in \mathcal{B}^{(i)}}[\nabla_\theta l(\theta; x)] = \nabla_\theta l(\theta), \forall i \quad (A13)$$

$$\mathbb{E}_{x \in \mathcal{B}^{(i)}}[\nabla_\theta \Phi(\theta; x)] = \nabla_\theta \Phi(\theta), \forall i, \quad (A14)$$

where recall that $\mathcal{B}^{(i)}$ denotes a data batch used at worker i, $$\nabla_\theta l(\theta) := \frac{1}{M} \sum_{i=1}^{M} \nabla_\theta l_i \theta \text{ and } \nabla_\theta \Phi(\theta) := \frac{1}{M} \sum_{i=1}^{M} \nabla_\theta \Phi_i(\theta);$$

and $$\mathbb{E}_{x \in \mathcal{B}^{(i)}} \|\nabla_\theta l(\theta; x) - \nabla_\theta l(\theta)\|^2 \leq \sigma^2, \forall i \quad (A15)$$

$$\mathbb{E}_{x \in \mathcal{B}^{(i)}} \|\nabla_\theta \Phi V(\theta; x) - \nabla_\theta \Phi(\theta)\|^2 \leq \sigma^2, \forall i. \quad (A16)$$

Further, a component-wise bounded variance of the gradient estimate is defined:

$$\mathbb{E}_{x \in \mathcal{B}^{(i)}} \|[\nabla_\theta l(\theta; x)]_{jk} - [\nabla_\theta l(\theta)]_{jk}\|^2 \leq \sigma_{jk}^2, \forall i \quad (A17)$$

$$\mathbb{E}_{x \in \mathcal{B}^{(i)}} \|[\nabla_\theta \Phi(\theta; x)]_{jk} - [\nabla_\theta \Phi(\theta)]_{jk}\|^2 \leq \sigma'_{jk}^2, \forall i, \quad (A18)$$

wherein j denotes the index of the layer, and k denotes the index of entry at each layer. Under Assumption 3, one has $\sum_{j=1}^{h} \sum_{k=1}^{d_j} \max \{\sigma_{jk}^2, \sigma'_{jk}^2\} \leq \sigma^2$.

With an Assumption 4, it is assumed that the component wise compression error has bounded variance:

$$\mathbb{E}[(Q([g^{(i)}(\theta)]_{jk}) - [g^{(i)}(\theta)]_{jk})^2] \leq \delta_{jk}^2, \forall i. \quad (A19)$$

The Assumption 4 is satisfied as the randomized quantization is used. See Alistarh, Lemma 3.1.

The oracle of maximization is now described. In practice, $\Phi_i(\theta; x)$, $\forall i$ may not be obtained, since the inner loop needs to iterate by the infinite number of iterations to achieve the exact maximum point. Therefore, allowance was made for some numerical error term resulted in the maximization step at Equation A1. This consideration makes the convergence analysis more realistic.

First, the following criterion is used to measure the closeness of the approximate maximizer to the optimal one, Definition 1. Under Equation A2, if point $\delta(x)$ satisfies $$\max_{\delta \leq \|\epsilon\|} \langle \delta - \delta * (x), \nabla_{\delta \phi}(\theta, \delta * (x); x) \rangle \leq \varepsilon, \quad (A20)$$

then it is an $\epsilon$ approximate solution to $\delta^*(x)$, where $$\delta * (x) := \arg\max_\delta \phi(\theta, \delta; x) \quad (A21)$$

and x denotes the sampled data. The condition in Equation A20 is standard for defining approximate solutions of an optimization problem over a compact feasible set.

In the following, it is shown that when the inner maximization problem is solved accurately enough, the gradients of function $\phi(\theta, \delta(x); x)$ at $\delta(x)$ and $\delta^*(x)$ are also close. For completeness of the analysis, the specific statement for the problem is provided here along with the detailed proof.

Lemma 1. Let $\delta_t^{(k)}$ be the $(\mu \epsilon)/L_\phi^2$ approximate solution of the inner maximization problem for worker k, i.e., $\max_{\delta^{(k)}} \phi(\theta, \delta^{(k)}; x_t)$, where $x_t$ denotes the sampled data at the tth iteration of distributed adversarial training. Under Equation A2, $$\|\nabla_\theta \phi(\theta_t, \delta_t^{(k)}(x_t); x_t) - \nabla_\theta \phi(\theta_t, (\delta^*)_t^{(k)}(x_t); x_t)\|^2 \leq \varepsilon \quad (A22)$$

Throughout the convergence analysis, it is assumed that $\delta_t^{(k)}(x_t)$, $\forall k, t$ are all the $(\mu \epsilon)/L_{99}^2$ solutions of the inner maximization problem. The following is defined:

$$\|[\nabla \phi(\theta_t, \delta_t^{(k)}(x_t); x_t)]_{ij} - [\nabla \phi(\theta_t, (\delta^*)_t^{(k)}(x_t); x_t)]_{ij}\|^2 = \varepsilon_{ij}. \quad (A23)$$

From Lemma 1 above, it is known that when $\delta_t^{(k)}(x_t)$ is an $(\mu \epsilon)/L_\phi^2$ approximate solution, then $$\sum_{i=1}^{h} \sum_{j=1}^{d_i} \varepsilon_{ij} = \quad (A24)$$

$$\sum_{i=1}^{h} \sum_{j=1}^{d_i} \left\| [\nabla \phi(\theta_t, \delta_t^{(k)}(x_t); x_t)]_{ij} - [\nabla \phi(\theta_t, (\delta^*)_t^{(k)}(x_t); x_t)]_{ij} \right\|^2 \leq \varepsilon.$$

In the following, the formal statement of convergence rate of distributed adversarial training is provided. The analysis focuses on the 1-sided quantization, namely step 10 of Algorithm A1 is omitted, and specifies the outer minimization oracle by LAMB, see Algorithm A2 below. The addition and multiplication operations in LAMB are component-wise.

In accordance with a Theorem 2, under Assumptions 1-4 (see above), suppose that $\{\theta_t\}$ is generated by distributed adversarial training for a total number of T iterations, and let the problem dimension at each layer be $d_i = d/h$. Then the convergence rate of distributed adversarial training is given by:

$$\frac{1}{T} \sum_{t=1}^{T} \mathbb{E} \|\nabla_\theta \Psi(\theta_t)\|^2 \leq \quad (A25)$$

$$\frac{\Delta_\Psi}{\eta_t c_l C T} + 2\left(\varepsilon + \frac{(1+\lambda)\sigma^2}{MB}\right) + 4\delta^2 + \frac{\kappa\sqrt{3}}{C}\|\chi\|_1 + \frac{\eta_t c_u \kappa \|L\|_1}{2C},$$

wherein $\Delta_\Psi := \mathbb{E}[\Psi(\theta_1) - \Psi^*]$, $\eta_t$ is the learning rate, $\kappa = c_u/c_l$, $c_l$ and $c_u$ are constants used in LALR Equation 5, $\chi$ is an error term with the (ih+j)th entry being $$\sqrt{\frac{(1+\lambda)\sigma_{ij}^2}{MB} + \varepsilon_{ij} + \delta_{ij}^2},$$

$\varepsilon$ and $\varepsilon_{ij}$ were given in Equation A24, $L=[L_1, \ldots, L_h]^T$, $$C = \frac{1}{4}\sqrt{\frac{h(1-\beta_2)}{G^2 d}},$$

$0<\beta_2<1$ is given in LAMB, $B=\min\{\mathcal{B}^{(i)}, \forall i\}$, and $G$ is given in Assumption 1.

Remark 1. When the batch size is large, i.e., $B \sim \sqrt{T}$, then the gradient estimate error will be $O(\sigma^2/\sqrt{T})$. Further, it is worth noting that different from the convergence results of LAMB, there is a linear speedup of decreasing the gradient estimate error in distributed adversarial training with respect to M, i.e., $O(\sigma^2/M\sqrt{T})$, which is the advantage of using multiple computing nodes.

Remark 2. It is notable that Assumption 4 implies:

$$\mathbb{E}\left[(Q([g^{(k)}(\theta)]_{ij}) - [g^{(k)}(\theta)]_{ij})^2\right] \leq \Sigma_{i=1}^h \Sigma_{j=1}^{d_i} \delta_{ij}^2 := \delta^2.$$

From Alistarh, Lemma 3.1, it is known that $\delta^2 \leq \min\{d/s^2, \sqrt{d}/s\}G^2$. Recall that $s=2^b$, where $b$ is the number of quantization bits.

Therefore, with a proper choice of the parameters, the following convergence result that has been shown in Theorem 1 can be achieved.

Corollary 1. Under the same conditions of Theorem 2, if the following is chosen:

$$\eta_t \sim O(1/\sqrt{T}), \varepsilon \sim O(\xi^2), \tag{A26}$$

then $$\frac{1}{T}\sum_{t=1}^T \mathbb{E}\|\nabla_\theta \Psi(\theta_t)\|^2 \leq \frac{\Delta_\Psi}{c_l C \sqrt{T}} + \frac{(1+\lambda)\sigma^2}{MB} + \frac{c_u \kappa \|L\|_1}{2C\sqrt{T}} + O\left(\xi, \frac{\sigma}{\sqrt{MT}}, \min\left\{\frac{d}{4^b}, \frac{\sqrt{d}}{2^b}\right\}\right). \tag{A27}$$

In summary, when the batch size is large enough, distributed adversarial training converges to a first-order stationary point of Equation 2, and there is a linear speed-up in terms of M with respect to $\sigma^2$. The details of the proof will follow.

Detailed proofs of the convergence analysis are now provided. In the proof, the following inequality and notations are employed.

1. Young's inequality with parameter $\epsilon$ is $$\langle x, y \rangle \leq \frac{1}{2\epsilon}\|x\|^2 + \frac{\epsilon}{2}\|y\|^2, \tag{A28}$$

wherein x, y are two vectors.

2. Define the historical trajectory of the iterates as $\mathcal{F}_t = \{\theta_{t-1}, \ldots, \theta_1\}\mathcal{F}$.

3. Denote vector $[x]_i$ as the parameters at the ith layer of the neural net and $[x]_{ij}$ represents the jth entry of the parameter at the ith layer.

4. Define $$g_t := \frac{1}{M}\sum_{i=1}^M \mathbb{E}_{x_t \in \mathcal{B}^{(i)}}\left(\lambda \nabla l(\theta_t; x_t) + \nabla_\theta \phi(\theta_t, \delta_t^{(i)}(x_t); x_t)\right) = \frac{1}{M}\sum_{i=1}^M g_t^{(i)}. \tag{A29}$$

The details of the LAMB algorithm A2 are provided in FIG. 12. As shown in FIG. 12, Algorithm A2 takes as inputs the learning rate $\eta_t$, $0<\beta_1, \beta_2<1$, scaling function $t(\bullet)$, $\varsigma>0$ and, for $t=1, \ldots$, does:

$m_t = \beta_1 m_{t-1} + (1-\beta_1)\hat{g}_t$, where $g_t$ is given by Equation A3
$v_t = \beta_2 v_{t-1} + (1-\beta)\hat{g}_t^2$
$m_t = m_t/(1-\beta_1^t)$
$v_t = v_t/(1-\beta_2^t)$ and computes ratio $$u_t = \frac{m_t}{\sqrt{v_t} + \varsigma}$$

The following update is then made:

$$\theta_{t+1,i} = \theta_{t,i} - \frac{\eta_t \tau(\|\theta_{t,i}\|)}{\|u_{t,i}\|} u_{t,i}. \tag{A30}$$

The following is a proof of Lemma 1. Assumption 2 provides:

$$\|\nabla \phi(\theta_t, \delta_t^{(i)}(x_t); x_t) - \nabla \phi(\theta_t, (\delta^*)_t^{(i)}(x_t); x_t)\| \leq L_\phi \|\delta_t^{(i)}(x_t) - (\delta^*)_t^{(i)}(x_t)\| \tag{A31}$$

Also, it is known that function $\phi(\theta, \delta, x)$ is strongly concave with respect to $\delta$. Thus, $$\mu\|\delta_t^{(i)}(x_t) - (\delta^*)_t^{(i)}(x_t)\|^2 \leq \langle \nabla_\delta \phi(\theta_t, (\delta^*)_t^{(i)}(x_t); x_t) - \nabla \phi(\theta_t, (\delta_t^{(i)}(x_t); x_t), \delta_t^{(i)}(x_t) - (\delta^*)_t^{(i)}) \rangle. \tag{A32}$$

Next, two conditions about the qualities of solutions $\delta_t^{(i)}(x_t)$ and $(\delta^*)_t^{(i)}(x_t)$ are used. First, it is known that $\delta_t^{(i)}(x)_t$ is a-$\varepsilon$ approximate solution to $(\delta^*)_t^{(i)}(x_t)$, thus $$\langle (\delta^*)_t^{(i)}(x_t) - \delta_t^{(i)}(x_t), \nabla_\delta \phi(\theta_t, \delta_t^{(i)}(x_t); x_t) \rangle \leq \varepsilon. \tag{A33}$$

Second, since $(\delta^*)_t^{(i)}(x_t)$ is the optimal solution, it satisfies $$\langle (\delta_t^{(i)}(x_t) - (\delta^*)_t^{(i)}(x_t), \nabla_\delta \phi(\theta_t, (\delta^*)_t^{(i)}(x_t); x_t) \rangle \leq 0. \tag{A34}$$

Adding them together, the following is obtained, $$\langle \delta_t^{(i)}(x_t) - (\delta^*)_t^{(i)}(x_t), \nabla_\delta \phi(\theta_t, (\delta^*)_t^{(i)}(x_t); x_t) - \nabla_\delta \phi(\theta_t, \delta_t^{(i)}(x_t); x_t) \rangle \leq \varepsilon. \tag{A35}$$

Substituting Equation A35 into Equation A32 provides:

$$\mu\|\delta_t^{(i)}(x_t) - (\delta^*)_t^{(i)}(x_t)\|^2 \leq \varepsilon \tag{A36}$$

Combining Equation A31 provides:

$$\left\|\nabla \phi\left(\theta_t, \delta_t^{(i)}(x_t); x_t\right) - \nabla \phi\left(\theta_t, (\delta^*)_t^{(i)}(x_t); x_t\right)\right\|^2 \leq L_\phi^2 \frac{\varepsilon}{\mu}. \tag{A37}$$

The descent of quantized LAMB is now described. First, the following lemma (Lemma 2) is provided as a stepping stone for the subsequent analysis.

Lemma 2. Under Assumptions 1-3, suppose that sequence $\{\theta_t\}$ is generated by distributed adversarial training. Then, $$\mathbb{E}[-\langle \nabla \Psi(\theta_t), \hat{g}_t \rangle] \leq -\frac{\mathbb{E}\|\nabla \Psi(\theta_t)\|^2}{2} + \varepsilon + \frac{(1+\lambda)\sigma^2}{MB}. \tag{A38}$$

Proof. From Equation A21, Equation A7 and Assumption 2, it is known that:

$$\nabla_\theta \Phi_t(\theta, x) = \nabla_\theta \phi(\theta, (\delta^*)^{(i)}(x); x), \tag{A39}$$

and thus $$\nabla_\theta \Psi(\theta) = \frac{1}{M}\sum_{i=1}^{M}\lambda\nabla_\theta l_i(\theta) + \nabla_\theta \Phi_i(\theta) \quad \text{(A40)}$$

$$= \lambda\nabla_\theta l(\theta) + \frac{1}{M}\sum_{i=1}^{M}\mathbb{E}_{x\in D^{(i)}}\nabla_\theta \phi\big(\theta, (\delta^*)^{(i)}(x); x\big) \quad \text{(A41)}$$

$$:= \bar{g}(\theta). \quad \text{(A42)}$$

Then, one has $$\mathbb{E}\langle\nabla\Psi(\theta_t), g_t\rangle = \mathbb{E}\langle\nabla\Psi(\theta_t), \bar{g}_t\rangle + \mathbb{E}\langle\nabla\Psi(\theta_t), g_t - \bar{g}_t\rangle \quad \text{(A43)}$$

$$= \mathbb{E}_{\mathcal{F}_t}\mathbb{E}_{x_t|\mathcal{F}_t}\langle\nabla\Psi(\theta_t), \bar{g}_t\rangle + \mathbb{E}\langle\nabla\Psi(\theta_t), g_t - \bar{g}_t\rangle \quad \text{(A44)}$$

$$\overset{(A42)}{=} \mathbb{E}\|\nabla\Psi(\theta_t)\|^2 + \mathbb{E}\langle\nabla\Psi(\theta_t), g_t - \bar{g}_t\rangle \quad \text{(A45)}$$

$$= \mathbb{E}\|\nabla\Psi(\theta_t)\|^2 + \mathbb{E}\langle\nabla\Psi(\theta_t), g_t - g_t^*\rangle + \mathbb{E}\langle\nabla\Psi(\theta_t), g_t^* - \bar{g}_t\rangle \quad \text{(A46)}$$

where $$\bar{g}_t := \frac{1}{M}\sum_{i=1}^{M}\mathbb{E}_{x_t\in D^{(i)}}\big(\lambda\nabla l(\theta_t, x_t) + \nabla_\theta\phi\big(\theta_t, (\delta^*)_t^{(i)}(x_t); x_t\big)\big) = \lambda\nabla l(\theta_t) + \nabla\Phi(\theta_t) \quad \text{(A47)}$$

and $$g_t^* := \frac{1}{M}\sum_{i=1}^{M}\mathbb{E}_{x_t\in\mathcal{B}^{(i)}}\big(\lambda\nabla l(\theta_t, x_t) + \nabla_\theta\phi\big(\theta_t, (\delta^*)_t^{(i)}(x_t); x_t\big)\big) \quad \text{(A48)}$$

Next, the difference between $g_t$ and $g_t^*$ can be quantified by gradient Lipschitz continuity of function t(•) as the following:

$$\mathbb{E}\|g_t - g_t^*\|^2 \overset{(a)}{\leq} \frac{1}{M}\sum_{i=1}^{M}\mathbb{E}_{\mathcal{F}_t}\mathbb{E}_{x_t|\mathcal{F}_t}\big[\big\|\nabla_\theta\phi\big(\theta_t, (\delta^*)^{(i)}(x_t); x_t\big) - \nabla_\theta\phi\big(\theta_t, \delta^{(i)}(x_t); x_t\big)\big\|^2\big] \overset{(A24)}{\leq} \varepsilon, \quad \text{(A49)}$$

where in (a) Jensen's inequality is used. And the difference between $\bar{g}_t$ and $g_t^*$ can be upper bounded by $$\mathbb{E}\|\bar{g}_t - g_t^*\|^2 = \mathbb{E}_{\mathcal{F}_t}\left\|\frac{1}{M}\sum_{i=1}^{M}\mathbb{E}_{x_t|\mathcal{F}_t}\nabla_\theta\phi(\theta_t, (\delta^*)(i)(x_t); x_t) - \nabla_\theta\phi(\theta_t)\right\|^2 + \lambda\mathbb{E}_{\mathcal{F}_t}\left\|\frac{1}{M}\sum_{i=1}^{M}\mathbb{E}_{x_t|\mathcal{F}_t}\nabla l(\theta_t, x_t) - \nabla l(\theta_t)\right\|^2 \quad \text{(A50)}$$

$$\overset{A3}{=} \frac{(1+\lambda)\sigma^2}{MB}. \quad \text{(A51)}$$

Applying Young's inequality provides:

$$\mathbb{E}[-\langle\nabla\Psi(\theta_t), g_t\rangle] \leq -\mathbb{E}\|\nabla\Psi(\theta_t)\|^2 + \frac{\mathbb{E}\|\nabla\Psi(\theta_t)\|^2}{2} + \mathbb{E}\|\bar{g}_t - g_t^*\|^2 + \mathbb{E}\|g_t^* - g_t\|^2 \quad \text{(A52)}$$

$$\overset{(A49)}{\leq} -\frac{\mathbb{E}\|\nabla\Psi(\theta_t)\|^2}{2} + \varepsilon + \frac{(1+\lambda)\sigma^2}{MB}. \quad \text{(A53)}$$

The following is a proof of Theorem 2.
Proof. For simplicity, set $\beta_i=0$ in LAMB. From gradient Lipschitz continuity, one has $$\Psi(\theta_{t+1}) \overset{A1}{\leq} \Psi(\theta_t) + \sum_{i=1}^{h}\langle[\nabla_\theta\Psi(\theta_t)]_i, \theta_{t+1,i} - \theta_{t,i}\rangle + \sum_{i=1}^{h}\frac{L_i}{2}\|\theta_{t+1,i} - \theta_{t,i}\|^2 \quad \text{(A54)}$$

$$\overset{(a)}{\leq} \Psi(\theta_t) - \eta_t\sum_{i=1}^{h}\sum_{j=1}^{d_i}\underbrace{\tau(\|\theta_{t,i}\|)\left\langle[\nabla\Psi(\theta_t)]_{ij}, \frac{[u_t]_{ij}}{\|u_{t,i}\|}\right\rangle}_{:=\mathcal{R}} + \sum_{i=1}^{h}\frac{\eta_t^2 c_u^2 L_i}{2}, \quad \text{(A55)}$$

where in (a) Equation A30 is used, and the upper bound of $\tau(\|\theta_{tj}\|)$.

Next, term R is split as two parts by leveraging sign $([\nabla\Psi(\theta_t)]_{ij})$ and sign $([u_t]_{ij})$ as follows.

$$\mathcal{R} = -\eta_t \sum_{i=1}^{h}\sum_{j=1}^{d_i} \tau(\|\theta_{t,i}\|)[\nabla\Psi(\theta_t)]_{ij}\frac{[u_t]_{ij}}{\|u_{t,i}\|} \mathbf{1}\big(\text{sign}([\nabla\Psi(\theta_t)]_{ij}) = \text{sign}([u_t]_{ij})\big) - \eta_t \sum_{i=1}^{h}\sum_{j=1}^{d_i} \tau(\|\theta_{t,i}\|)[\nabla\Psi(\theta_t)]_{ij}\frac{[u_t]_{ij}}{\|u_{t,i}\|} \mathbf{1}\big(\text{sign}([\nabla\Psi(\theta_t)]_{ij}) \ne \text{sign}([u_t]_{ij})\big) \quad (A56)$$

$$\stackrel{(a)}{\le} -\eta_t c_l \sum_{i=1}^{h}\sum_{j=1}^{d_i} \sqrt{\frac{1-\beta_2}{G^2 d_i}}[\nabla\Psi(\theta_t)]_{ij}[\hat{g}_t]_{ij}\mathbf{1}\big(\text{sign}([\nabla\Psi(\theta_t)]_{ij}) = \text{sign}([\hat{g}_t]_{ij})\big) - \eta_t \sum_{i=1}^{h}\sum_{j=1}^{d_i} \tau(\|\theta_{t,i}\|)[\nabla\Psi(\theta_t)]_{ij}\frac{[u_t]_{ij}}{\|u_{t,i}\|} \mathbf{1}\big(\text{sign}([\nabla\Psi(\theta_t)]_{ij}) \ne \text{sign}([u_t]_{ij})\big) \quad (A57)$$

$$\stackrel{(b)}{\le} -\eta_t c_l \sum_{i=1}^{h}\sum_{j=1}^{d_i} \sqrt{\frac{1-\beta_2}{G^2 d_i}}[\nabla\Psi(\theta_t)]_{ij}[\hat{g}_t]_{ij} - \eta_t \sum_{i=1}^{h}\sum_{j=1}^{d_i} \tau(\|\theta_{t,i}\|)[\nabla\Psi(\theta_t)]_{ij}\frac{[u_t]_{ij}}{\|u_{t,i}\|} \mathbf{1}\big(\text{sign}([\nabla\Psi(\theta_t)]_{ij}) \ne \text{sign}([u_t]_{ij})\big) \quad (A58)$$

where in (a) the fact that $$\|u_{t,i}\| \le \sqrt{\frac{d_i}{1-\beta_2}}$$

and $\sqrt{v_t} \le G$ is used, and in (b) the following is added, $$-\eta_t c_l \sum_{i=1}^{h}\sum_{j=1}^{d_i}\sqrt{\frac{1-\beta_2}{G^2 d_i}}[\nabla\Psi(\theta_t)]_{ij}[\hat{g}_t]_{ij}\mathbf{1}\big(\text{sign}([\nabla\Psi(\theta_t)]_{ij}) \ne \text{sign}([\hat{g}_t]_{ij})\big) \ge 0 \quad (A59)$$

Taking expectation on both sides of Equation A58 provided the following:

$$\mathbb{E}[\mathcal{R}] \le -\eta_t c_l \sqrt{\frac{h(1-\beta_2)}{G^2 d}} \underbrace{\sum_{i=1}^{h}\sum_{j=1}^{d_i}\mathbb{E}\big[[\nabla\Psi(\theta_t)]_{ij}[\hat{g}_t]_{ij}\big]}_{:=u} + \quad (A60)$$

$$-\eta_t c_u \underbrace{\sum_{i=1}^{h}\sum_{j=1}^{d_i}\mathbb{E}\big[[\nabla\Psi(\theta_t)]_{ij}\mathbf{1}\big(\text{sign}([\nabla\Psi(\theta_t)]_{ij}) \ne \text{sign}([u_t]_{ij})\big)\big]}_{:=v}.$$

Next, the upper bounds of U and V are obtained separably as follows. First, the inner product between $[\nabla\Psi(\theta)]_{ij}$ and $[\hat{g}_t]_{ij}$ is written more compactly, $$u \le -\eta_t c_l \sqrt{\frac{h(1-\beta_2)}{G^2 d}} \sum_{i=1}^{h} \mathbb{E}\langle[\nabla\Psi(\theta)]_i, [\hat{g}_t]_i\rangle \quad (A61)$$

$$\le -\eta_t c_l \sqrt{\frac{h(1-\beta_2)}{G^2 d}} \sum_{i=1}^{h} \mathbb{E}\langle[\nabla\Psi(\theta)]_i, [\hat{g}_t]_i - [g_t]_i + [g_t]_i\rangle \quad (A62)$$

$$\le -\eta_t c_l \sqrt{\frac{h(1-\beta_2)}{G^2 d}} \quad (A63)$$

$$\left(\mathbb{E}\langle\nabla\Psi(\theta), g_t\rangle + \sum_{i=1}^{h}\mathbb{E}\langle[\nabla\Psi(\theta_t)]_i, [\hat{g}_t]_i - [g_t]_i\rangle\right).$$

Applying Lemma 2 provides $$u \stackrel{(A38)}{\le} -\eta_t c_l \sqrt{\frac{h(1-\beta_2)}{G^2 d}} \frac{1}{2}\mathbb{E}\|\nabla\Psi(\theta_t)\|^2 + \quad (A64)$$

$$\eta_t c_l \sqrt{\frac{h(1-\beta_2)}{G^2 d}}\left(\varepsilon + \frac{(1+\lambda)\sigma^2}{MB}\right) -$$

$$\eta_t c_l \sqrt{\frac{h(1-\beta_2)}{G^2 d}} \sum_{i=1}^{h}\mathbb{E}\langle[\nabla\Psi(\theta_t)]_i, [\hat{g}_t]_i - [g_t]_i\rangle$$

$$\stackrel{(a)}{\le} -\eta_t c_l \sqrt{\frac{h(1-\beta_2)}{G^2 d}}\frac{1}{2}\mathbb{E}\|\nabla\Psi(\theta_t)\|^2 + \quad (A65)$$

$$\eta_t c_l\sqrt{\frac{h(1-\beta_2)}{G^2 d}}\left(\varepsilon + \frac{(1+\lambda)\sigma^2}{MB}\right) +$$

$$\frac{\eta_t c_l}{4}\sqrt{\frac{h(1-\beta_2)}{G^2 d}}\frac{1}{2}\mathbb{E}\|\nabla\Psi(\theta_t)\|^2 +$$

$$c_l \eta_t \sqrt{\frac{h(1-\beta_2)}{G^2 d}}\mathbb{E}\|\hat{g}_t - g_t\|^2$$

$$\stackrel{(b)}{\le} -\frac{\eta_t c_l}{4}\sqrt{\frac{h(1-\beta_2)}{G^2 d}}\frac{1}{2}\mathbb{E}\|\nabla\Psi(\theta_t)\|^2 + \quad (A66)$$

$$\eta_t c_l\sqrt{\frac{h(1-\beta_2)}{G^2 d}}\left(\varepsilon + \frac{(1+\lambda)\sigma^2}{MB}\right) + \eta_t c_l \sqrt{\frac{h(1-\beta_2)}{G^2 d}}\delta^2$$

where in (a) Young's inequality is used, and in (b) one has $$\mathbb{E}\|\hat{g}_t - g_t\|^2 = \mathbb{E}\left\|\frac{1}{M}\sum_{i=1}^{M}Q(g_t^{(i)}) - g_t^{(i)}\right\|^2 \stackrel{A4}{\le} \delta^2 \quad (A67)$$

Second, the upper of V is given as:

$$v \le \eta_t c_u \sum_{i=1}^{h}\sum_{j=1}^{d_i}[\nabla\Psi(\theta_t)]_{ij}\underbrace{\mathbb{P}\big(\text{sign}([\nabla\Psi(\theta_t)]_{ij}) \ne \text{sign}([\hat{g}_t]_{ij})\big)}_{:=\mathcal{W}} \quad (A68)$$

where the upper bound of W can be quantified by using Markov's inequality followed by Jensen's inequality as the following:

$$\mathcal{W} = \mathbb{P}\big(\text{sign}([\nabla\Psi(\theta_t)]_{ij}) \ne \text{sign}([\hat{g}_t]_{ij})\big)$$

$$\le \mathbb{P}\big[\big|[\nabla\Psi(\theta_t)]_{ij} - [\hat{g}_t]_{ij}\big| > [\nabla\Psi(\theta_t)]_{ij}\big] \quad (A69)$$

$$\le \frac{\mathbb{E}\big[\big|[\nabla\Psi(\theta_t)]_{ij} - [\hat{g}_t]_{ij}\big|\big]}{\big|[\nabla\Psi(\theta_t)]_{ij}\big|} \quad (A70)$$

$$\le \frac{\sqrt{\mathbb{E}\big[([\nabla\Psi(\theta_t)]_{ij} - [\hat{g}_t]_{ij})^2\big]}}{\big|[\nabla\Psi(\theta_t)]_{ij}\big|} \quad (A71)$$

-continued $$\stackrel{(442)}{\leq} \frac{\sqrt{\mathbb{E}\left[\left([\overline{g}_t]_{ij} - [g_t^*]_{ij} + [g_t^*]_{ij} - [g_t]_{ij} + [g_t]_{ij} - [\hat{g}_t]_{ij}\right)^2\right]}}{\left|[\nabla \Psi(\theta_t)]_{ij}\right|} \quad (A72)$$

$$\stackrel{(a)}{\leq} \sqrt{3} \frac{\sqrt{\frac{(1+\lambda)\sigma_{ij}^2}{M|\mathcal{B}|} + \epsilon_{ij} + \delta_{ij}^2}}{\left|[\nabla \Psi(\theta_t)]_{ij}\right|} \quad (A73)$$

where (a) is true due to the following relations: i) from Equation A51, providing:

$$\mathbb{E}\left[\left([\overline{g}_t]_{ij} - [g_t^*]_{ij}\right)^2\right] \leq \frac{(1+\lambda)\sigma_{ij}^2}{MB}; \quad (A74)$$

ii) from Equation A49, providing:

$$\mathbb{E}\left[([g_t]_{ij} - [g^*_t]_{ij})^2\right]\epsilon_{ij}; \quad (A75)$$

and iii) from Equation A67, it is known that:

$$\mathbb{E}\left[([\hat{g}_t]_{ij} - [g_t]_{ij})^2\right] \leq \delta_{ij}^2. \quad (76)$$

Therefore, combining Equation A55 with the upper bound of U shown in Equation A66 and V shown in Equation A68 and Equation A73 provides $$\mathbb{E}[\Psi(\theta_{t+1})] \leq \mathbb{E}[\Psi(\theta_t)] - \eta_t c_l \sqrt{\frac{h(1-\beta_2)}{G^2 d}} \frac{1}{4} \mathbb{E}\|\nabla \Psi(\theta_t)\|^2 +$$

$$\eta_t c_l \sqrt{\frac{h(1-\beta_2)}{G^2 d}} \left(\varepsilon + \frac{(1+\lambda)\sigma^2}{MB}\right) + \eta_t c_l \sqrt{\frac{h(1-\beta_2)}{G^2 d}} \delta^2 +$$

$$\eta_t c_u \sqrt{3} \sum_{i=1}^{h} \sum_{j=1}^{d_i} \sqrt{\frac{(1+\lambda)\sigma_{ij}^2}{MB} + \varepsilon_{ij} + \delta_{ij}^2} + \frac{\eta_t^2 c_u^2 \sum_{i=1}^{h} L_i}{2} \quad (A77)$$

Note that the error vector $\chi$ is defined as the following $$\chi = \begin{bmatrix} \sqrt{\frac{(1+\lambda)\sigma_{11}^2}{M|\mathcal{B}|} + \varepsilon_{11} + \delta_{11}^2} \\ \vdots \\ \sqrt{\frac{(1+\lambda)\sigma_{ij}^2}{M|\mathcal{B}|} + \varepsilon_{ij} + \delta_{ij}^2} \\ \vdots \\ \sqrt{\frac{(1+\lambda)\sigma_{hd_h}^2}{M|\mathcal{B}|} + \varepsilon_{hd_h} + \delta_{hd_h}^2} \end{bmatrix} \in \mathbb{R}^d, \quad (A78)$$

and one has $$L = \begin{bmatrix} L_1 \\ \vdots \\ L_h \end{bmatrix} \in \mathbb{R}^h. \quad (A79)$$

Recall $$\kappa = \frac{c_u}{c_l}. \quad (A80)$$

Rearranging the terms, one can arrive at $$\sqrt{\underbrace{\frac{h(1-\beta_2)}{G^2 d}}_{:=C}} \frac{1}{4}\left(\|\nabla \Psi(\theta_t)\|^2\right) \leq \frac{\mathbb{E}[\Psi(\theta_t)] - \mathbb{E}[\Psi(\theta_{t+1})]}{\eta_t c_l} + \quad (A81)$$

$$4C\delta^2 + 2C\left(\varepsilon + \frac{(1+\lambda)\sigma^2}{MB}\right) + \sqrt{3}\kappa\|\chi\|_1 + \frac{\eta_t c_u \kappa \|L\|_1}{2}.$$

Applying the telescoping sum over t=1, ..., T provides $$\frac{1}{T}\sum_{t=1}^{T} \mathbb{E}\|\nabla_\theta \Psi(\theta_t)\|^2 \leq \frac{\mathbb{E}[\Psi(\theta_1)] - \mathbb{E}[\Psi(\theta_{T+1})]}{\eta_t c_l C T} + \quad (A82)$$

$$2\left(\varepsilon + \frac{(1+\lambda)\sigma^2}{MB}\right) + 4\delta^2 + \frac{\kappa\sqrt{3}}{C}\|\chi\|_1 + \frac{\eta_t c_u \|L\|_1}{2C}.$$

Additional experiments are now described. Regarding cyclic learning rate, it has been shown in that the use of a cyclic learning rate (CLR) scheme can further accelerate the Fast AT algorithm in the small-batch setting. See Wong. Plot 1300 of FIG. 13 illustrates the performance of Fast AT with CLR versus batch sizes. It was observed that when CLR meets the large-batch setting, it becomes significantly worse than its performance in the small-batch setting. The reason is that CLR requires a certain number of iterations to proceed with the cyclic schedule. However, the use of large data batch only results in a small amount of iterations by fixing the number of epochs.

A description of the training details is now provided. Dataset 1 AT and Fast AT experiments were conducted at a single computing node with 16-core CPU, 128 GB RAM and 1 GPU. The training epoch was 100 by calling for the momentum SGD optimizer. The weight decay and momentum parameters were set to 0:0005 and 0:9. The initial learning rate was set with 0:05 (tuned over {10.005,0.01, 0.05,0.1}), which was decayed by ×1/10 at the training epoch 70, 85 and 95, respectively.

Dataset 1 distributed adversarial training (DAT) experiments were conducted at {1,6,12,18} computing nodes with 16-core CPU, 128 GB RAM and 1 GPU. The training epoch was 100 by calling for the LAMB optimizer. The weight decay was set to 0:0005. $\beta_1$ and $\beta_2$ were set to 0:9 and 0:999. The initial learning rate was tuned over {10.01,0.05,0.1, 0.2}, which was decayed by ×1/10 at the training epoch 70, 85 and 95, respectively. To execute algorithms with the initial learning rate $\eta_1$ greater than 0.1, the model weights were chosen after a 10-epoch warm-up as its initialization for DAT, where each warm-up epoch k used the linearly increased learning rate (k/10)$\eta_1$.

Dataset 2 AT and Fast AT experiments were conducted at a single computing node with dual 22-core CPU, 512 GB RAM and 6 GPUs. The training epoch was 30 by calling for the momentum SGD optimizer. The weight decay and momentum parameters were set to 0:0001 and 0:9. The initial learning rate was set to 0:1 (tuned over {10.01,0.05, 0.1,0.2}), which was decayed by ×1/10 at the training epoch 20, 25, 28, respectively.

Dataset 2 distributed adversarial training (DAT) experiments were conducted at {1,3,6} computing nodes with dual 22-core CPU, 512 GB RAM and 6 GPUs. The training epoch was 30 by calling for the LAMB optimizer. The weight decay was set to 0:0001. $\beta_1$ and $\beta_2$ were set to 0:9 and 0:999. The initial learning rate was tuned over {0.01,0.05, 0.1,0.2,0.4}, which was decayed by ×1/10 at the training epoch 20, 25, 28, respectively. To execute algorithms with the initial learning rate $\eta_1$ greater than 0.2, the model weights were chosen after 5-epoch warm-up as its initialization for DAT, where each warm-up epoch k used the linearly increased learning rate $(k/5)\eta_1$.

Empirical model convergence is now discussed by way of reference to plots 1400A and 1400B of FIGS. 14A and 14B. Namely, plots 1400A and 1400B of FIGS. 14A and 14B present the training accuracy and the objective value (loss) of DAT-PGD against training epochs. Namely, plot 1400A of FIG. 14A illustrates DAT-PGD for (Dataset 1, DNN model 1) using 6×1 computing configuration and 6×2048 batch size, and plot 1400B of FIG. 14B illustrates DAT-PGD for (Dataset 2, DNN model 2) using 6×6 computing configuration and 6×512 batch size. As can be seen by the results, the present DAT approach converges well within 100 and 30 epochs in the setting of (Dataset 1, DNN model 1) and (Dataset 2, DNN model 2), respectively.

Tuning the LALR hyperparameter $c_u$ is now described. The sensitivity of the performance of distributed adversarial training (DAT) to the choice of the hyperparameter $c_u$ in LALR was also evaluated. See, for example, Table 1500 in FIG. 15 which illustrates the TA/RA of DAT-FGSM under (Dataset 1, DNN model 1) using 18×2048 batch size versus different choices of LALR hyperparameter $c_u$. In Table 1500, $c_l=0$ (this is a natural choice) is fixed but $c_u \in \{8,9,10,11,12\}$ varies when DAT-FGSM is executed under Dataset 1 using 18×2048 batch size, where $c_u=10$ is the default choice. As can be seen from the results, both RA and TA are not quite sensitive to $c_u$ and the default choice yields the RA-best model (in spite of minor improvement).

The overall performance of (Dataset 1, DNN model 2) distributed adversarial training (DAT) is presented in Table 1600 of FIG. 16. Namely, Table 1600 illustrates the overall performance of DAT (in gray color), compared with baselines, in TA (%), RA (%), communication time per epoch (seconds), and total training time (including communication time) per epoch (in seconds). For brevity, 'pxq' represents '# nodes×# GPUs per node', 'Comm.' represents communication cost, and 'Tr. Time' represents training time. As shown in Table 1600, in the large-batch setting, the proposed DAT-PGD and DAT-FGSM algorithms outperform the baseline algorithm DAT-PGD w/o LALR, and result in competitive performance to AT and Fast AT, which call for more iterations by using a smaller batch size.

Plots 1700A and 1700B of FIGS. 17A and 17B, respectively, illustrate adversarial robustness against different PGD perturbations for the model trained by DAT-PGD, DAT-FGSM, and AT under (Dataset 1, DNN model 1). Namely, plot 1700A of FIG. 17A depicts RA against PGD perturbations with different perturbation sizes, namely values of $\epsilon$(over the divisor 255), and plot 1700B of FIG. 17B depicts RA against PGD perturbations with different steps. It was observed that distributed adversarial training (DAT) matches robust accuracies of standard AT even against PGD perturbations at different values of $\epsilon$ and steps. Specifically, DAT has slightly smaller RA than AT when facing weak PGD perturbations with $\epsilon$ less than (5/255) and steps less than 5. Moreover, although DAT-FGSM has the worst RA against weak PGD perturbations (which reduces to TA at $\epsilon=0$), it outperforms other methods when the perturbations become stronger in Dataset 1 experiments.

Figure 18A:
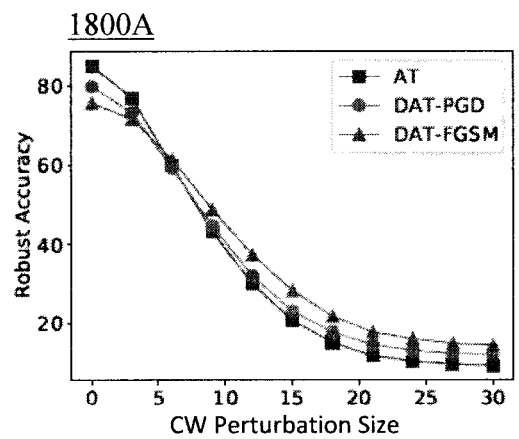
FIG. 18A is a diagram illustrating robust accuracies against C&W perturbations of different perturbation sizes for a first model trained by DAT-PGD, DAT-FGSM, and AT according to an embodiment of the present invention.
Figure 18B:
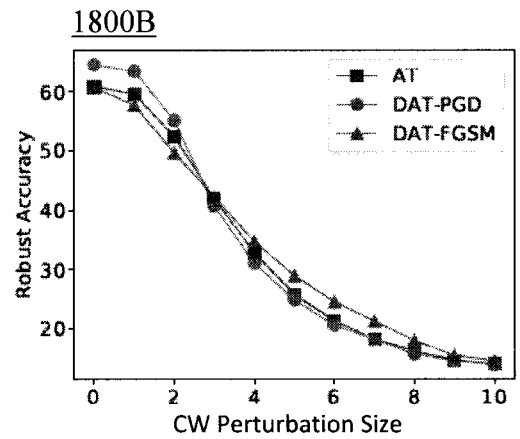
FIG. 18B is a diagram illustrating robust accuracies against C&W perturbations of different perturbation sizes for a second model trained by DAT-PGD, DAT-FGSM, and AT according to an embodiment of the present invention.

Plots 1800A and 1800B of FIGS. 18A and 18B, respectively, illustrate robust accuracies against C&W perturbations of different perturbation sizes. Namely, plot 1800A illustrates robust accuracies against C&W perturbations of different perturbation sizes for the model trained by DAT-PGD, DAT-FGSM, and AT under the setting (Dataset 1, DNN model 1), and plot 1800B illustrates robust accuracies against C&W perturbations of different perturbation sizes for the model trained by DAT-PGD, DAT-FGSM, and AT under the setting (Dataset 2, DNN model 2). Here for ease of C&W perturbation generation at Dataset 2, 1000 test Dataset 2 images (1 image per class) were randomly selected to generate C&W perturbations. As can be seen, the results are consistent with the aforementioned ones against PGD perturbations.

Figure 19:
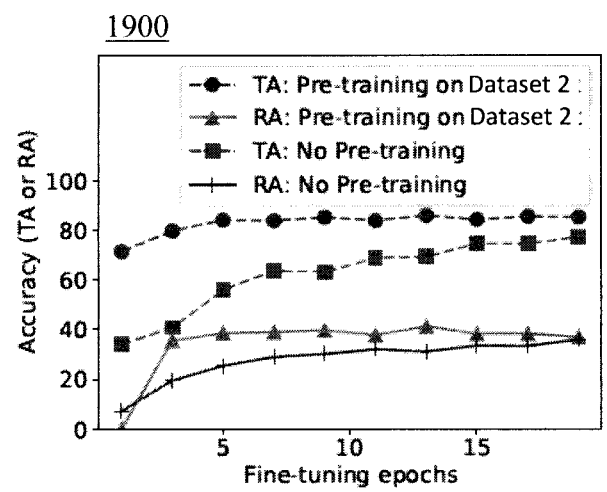
FIG. 19 is a diagram illustrating that a model DAT pre-trained model over a source dataset can offer fast fine-tuning to a down-stream target dataset according to an embodiment of the present invention.

Regarding distributed adversarial training (DAT) from pre-training to fine-tuning, plot 1900 of FIG. 19 investigates whether a DAT pre-trained model (DNN model 2) over a source dataset (Dataset 2) can offer a fast fine-tuning to a down-stream target dataset (Dataset 1). Namely, plot 1900 illustrates fine-tuning of DNN model 2 (pre-trained on Dataset 2) under Dataset 1. Here DAT-PGD is used for both pre-training and fine-tuning at 6 nodes with batch size 6×128. Compared with the direct application of DAT to the target dataset (without pre-training), the pre-training enables a fast adaption to the down-stream Dataset 1 task in both TA and RA within just 5 epochs.

Further quantization experiments are now described. Table 2000 of FIG. 20 illustrates the performance of distributed adversarial training (DAT) by making use of gradient quantization. Namely, Table 2000 illustrates the effect of gradient quantization on the performance of DAT for various numbers of bits. Two quantization scenarios are covered: 1) quantization is conducted at each worker (step 7 of Algorithm A1), and 2) quantization is conducted at both worker and server sides (steps 7 and 10 of Algorithm A1). As shown in Table 2000, when the number of bits is reduced from 32 to 8, the communication cost and the amount of transmitted data is saved by 2 and 4 times, respectively. Although the use of gradient quantization introduces a performance loss to some extent, the resulting TA and RA are still comparable to the best 32-bit case. In the worst case of Dataset 1 (8-bit 2-sided quantization), TA drops 0:91% and 6:33% for DAT-PGD and DAT-FGSM, respectively. And RA drops 4:73% and 5:22%, respectively. However, 8-bit 2-sided quantization transmitted the least amount of data per iteration. The training settings of (Dataset 1, DNN model 2) and (Dataset 2, DNN model 2) are consistent with those in Table 500 of FIG. 5.

To further reduce communication cost, DAT was also conducted at a high performance computing (HPC) cluster. The computing nodes of the cluster are connected with InfiniBand (IB) and PCIe Gen4 switch. To compare with the results in Table 500 of FIG. 5, 6 of 57 nodes of the cluster were used. Each node has 6 interconnected GPUs. Table 2100 of FIG. 21 illustrates the performance of DAT for Dataset 2, DNN model 2 with use of HPC compared to a standard (non-HPC) distributed system. As shown in Table 2100, the communication cost is largely alleviated, and thus the total training time is further reduced.

Table 2200 of FIG. 22 illustrates an additional experiment conducted by integrating a centralized method with gradient quantization operation on Dataset 1 under the batch size 2048 and 6×2048, respectively. The centralized method is specified as Fast AT with LALR, where LALR is introduced to improve the scalability of Fast AT under the larger batch size 6×2048. Due to the centralized implementation, only 1-sided gradient quantization (namely, no server-worker communication is involved) is needed. As illustrated in Table 2200, when the batch size 2048 is used, Fast AT w/LALR performs as well as Fast AT even at the presence of 8-bit gradient quantization. On the other hand, as the larger batch size 6×2048 is used, Fast AT w/LALR can still preserve the performance at the absence of gradient quantization. By contrast, Fast AT w/LALR at the presence of quantization encounters 6.05% TA drop. This suggests that even in the non-DAT setting, 8-bit gradient quantization hurts the performance as the batch size becomes large. Thus, in DAT it is not surprising that 8-bit quantized gradients could cause a non-trivial accuracy drop, particularly for using 2-sided gradient quantization and a much larger data batch size ($\geq 18\times 2048$ on CIFAR-10). One possible reason is that the quantization error cannot easily be mitigated as the number of iterations decreases (due to increased batch size under a fixed number of epochs).

As will be described below, one or more elements of the present techniques can optionally be provided as a service in a cloud environment. For instance, by way of example only, the one or more functions of the distributed computing machines M and/or server can be performed on a dedicated cloud server to take advantage of high-powered CPUs and GPUs, after which the result is sent back to the local device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 23:
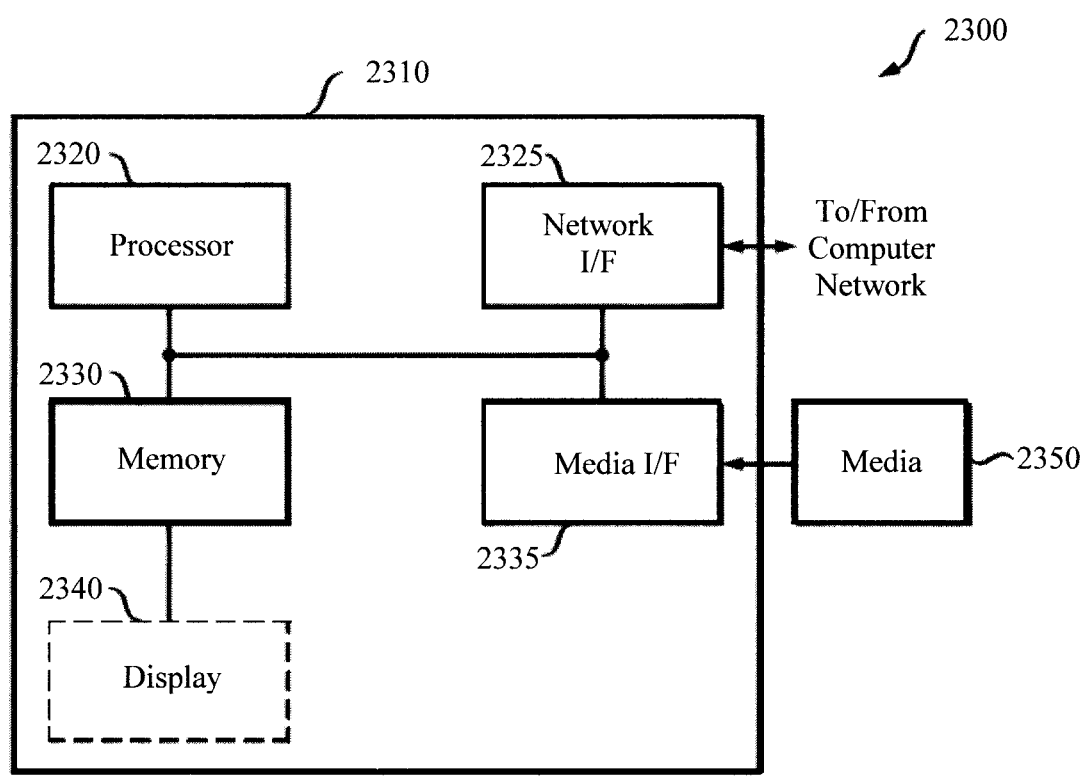
FIG. 23 is a diagram illustrating an exemplary apparatus for performing one or more of the methodologies presented herein according to an embodiment of the present invention.

Turning now to FIG. 23, a block diagram is shown of an apparatus 2300 for implementing one or more of the methodologies presented herein. By way of example only, apparatus 2300 can serve as a distributed computing machine M and/or as the central server, and be configured to implement one or more of the steps of methodology 200 of FIG. 2, one or more of the steps of methodology 300 of FIG. 3, one or more of the steps of methodology 400 of FIG. 4, one or more of the steps of Algorithm A1 of FIG. 11 and/or one or more of the steps of Algorithm A2 of FIG. 12.

Apparatus 2300 includes a computer system 2310 and removable media 2350. Computer system 2310 includes a processor device 2320, a network interface 2325, a memory 2330, a media interface 2335 and an optional display 2340. Network interface 2325 allows computer system 2310 to connect to a network, while media interface 2335 allows computer system 2310 to interact with media, such as a hard drive or removable media 2350.

Processor device 2320 can be configured to implement the methods, steps, and functions disclosed herein. The memory 2330 could be distributed or local and the processor device 2320 could be distributed or singular. The memory 2330 could be implemented as an electrical, magnetic or optical memory, or any combination of these or other types of storage devices. Moreover, the term "memory" should be construed broadly enough to encompass any information able to be read from, or written to, an address in the addressable space accessed by processor device 2320. With this definition, information on a network, accessible through network interface 2325, is still within memory 2330 because the processor device 2320 can retrieve the information from the network. It should be noted that each distributed processor that makes up processor device 2320 generally contains its own addressable memory space. It should also be noted that some or all of computer system 2310 can be incorporated into an application-specific or general-use integrated circuit.

Optional display 2340 is any type of display suitable for interacting with a human user of apparatus 2300. Generally, display 2340 is a computer monitor or other similar display.

Figure 24:
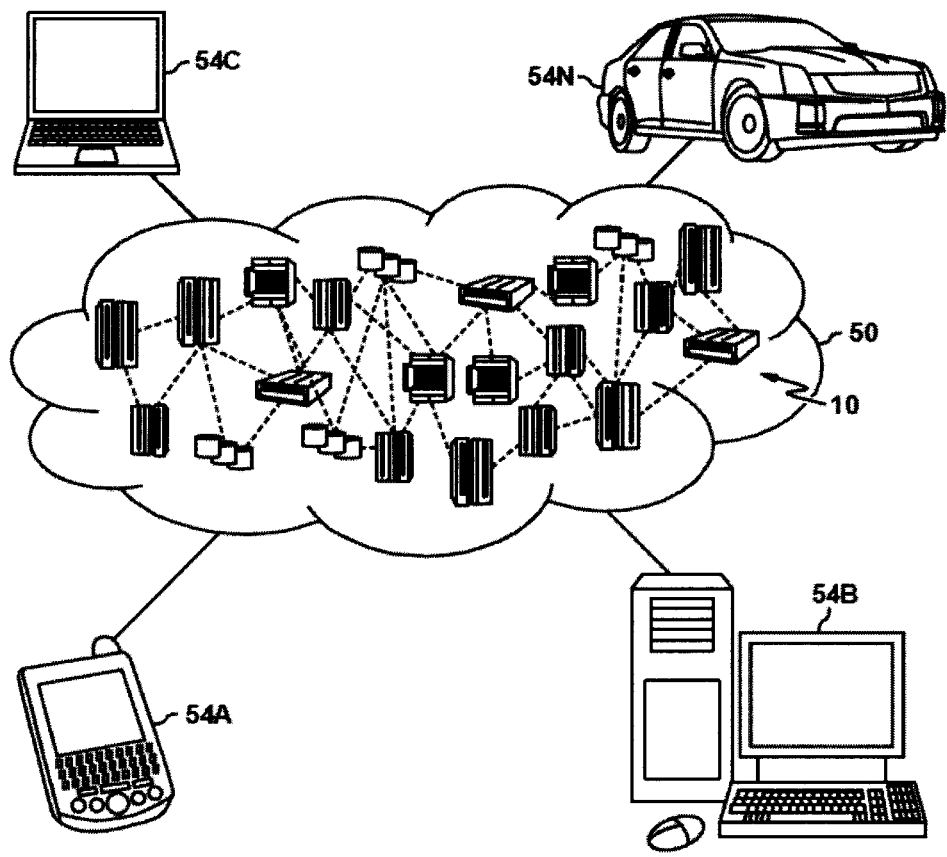
FIG. 24 depicts a cloud computing environment according to an embodiment of the present invention.
Figure 25:
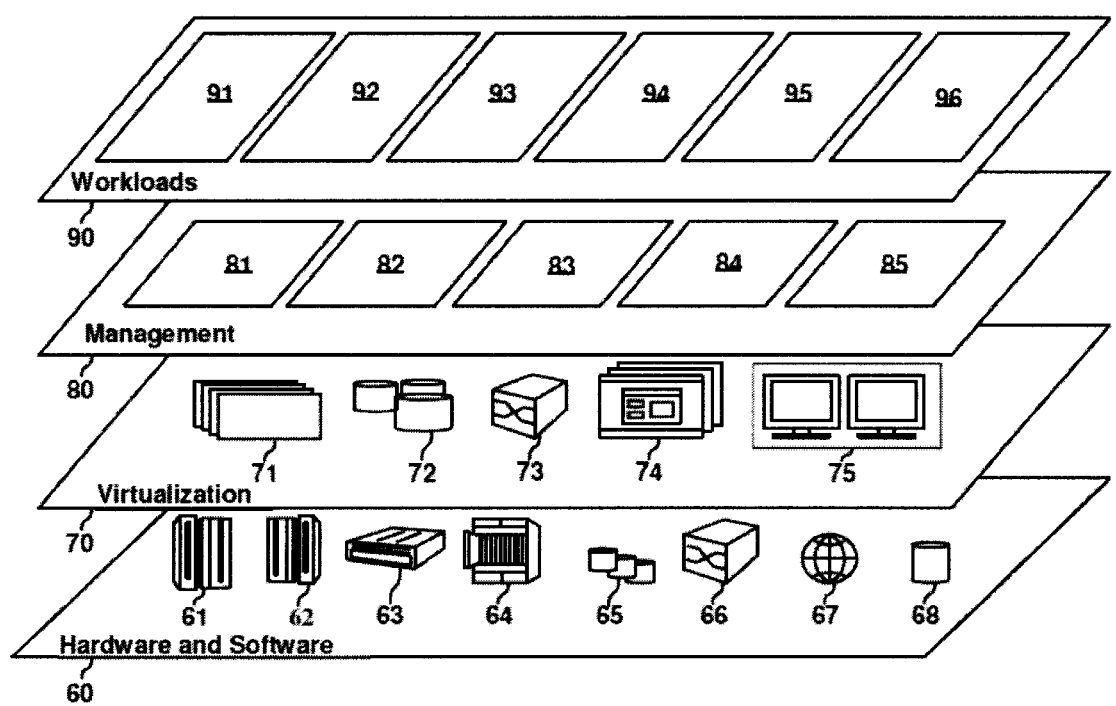
FIG. 25 depicts abstraction model layers according to an embodiment of the present invention.

Referring to FIG. 24 and FIG. 25, it is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 24, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 24 are intended to be illustrative only and that computing nodes 10 and cloud computing environment 50 can communicate with any type of computerized device over any type of network and/or network addressable connection (e.g., using a web browser).

Referring now to FIG. 25, a set of functional abstraction layers provided by cloud computing environment 50 (FIG. 24) is shown. It should be understood in advance that the components, layers, and functions shown in FIG. 25 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and distributed adversarial training 96.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. A method for distributed adversarial training of a deep neural network-based model by distributed computing machines M to avoid misclassification of inputs by the deep neural network and reduce a number of epochs required for training of the deep neural-network based model, the method comprising:

obtaining, by each of the distributed computing machines M, adversarial perturbation-modified training examples for samples in a local dataset $D^{(i)}$, the training examples included labeled or unlabeled data;

computing, by each of the distributed computing machines M, local gradients of a local cost function $f_i$ with respect to parameters θ of the deep neural network-based model stored and trained locally on each of the distributed computing machines M, the local gradients of the local cost functions calculated using the adversarial perturbation-modified training examples stored locally on each of the distributed computing machines M;

transmitting, from each of the distributed computing machines M, the calculated local gradients of the local cost function $f_i$ to a server which aggregates the local gradients of the local cost function $f_i$ calculated by each of the distributed computing machines M and transmits an aggregated gradient to the distributed computing machines M, the aggregated gradient calculated from the local gradients;

receiving, by each of the distributed computing machines M the aggregated gradient from the server;

updating, by each of the distributed computing machines M, the parameters θ of the deep neural network-based model stored at each of the distributed computing machines M based on the aggregated gradient received from the server to generate an updated neural-network based model; and classifying an input by one or more of the distributed computing machines M using an updated neural-based model, the updated neural-network based model robustly trained against worst-case loss induced by adversarially perturbed training examples.

2. The method of claim 1, further comprising:
compressing by each of the distributed computing machines M, the gradients of the local cost function $f_i$ prior to transmitting the gradients of the local cost function $f_i$ to the server.

3. The method of claim 2, wherein the gradients of the local cost function $f_i$ are compressed by quantization.

4. The method of claim 1, further comprising:
generating the adversarial perturbation-modified training examples using a multiple-step gradient ascent approach.

5. The method of claim 1, further comprising:
generating the adversarial perturbation-modified training examples using a one-step fast gradient sign approach.

6. The method of claim 1, wherein the server uses the aggregated gradient to update the parameters θ of the deep neural network-based model stored locally at the server.

7. The method of claim 1, wherein the aggregated gradient is compressed prior to the aggregated gradient being transmitted to the distributed computing machines M.

8. The method of claim 7, wherein the aggregated gradient is compressed by quantization.

9. The method of claim 1, wherein the parameters θ of the deep neural network-based model stored at each of the distributed computing machines M are updated using a layerwise adaptive learning rate (LALR) minimization approach.

10. A method for distributed adversarial training of a deep neural network-based model by a server to avoid misclassification of inputs by the deep neural network and reduce a number of epochs required for training of the deep neural-network based model, the method comprising:
obtaining, by the server, local gradients of a local cost function $f_i$ that have been computed with respect to parameters θ of the deep neural network-based model stored and trained locally on a plurality of distributed computing machines M using adversarial perturbation-modified training examples for samples in a local dataset $D^{(i)}$, the training examples included labeled or unlabeled data;
aggregating, by the server, the local gradients of the local cost function $f_i$ to calculate an aggregated gradient; and
transmitting, from the server, the aggregated gradient to the plurality of distributed computing machines M to update the parameters θ of the deep neural network-based model stored at each of the plurality of distributed computing machines M, the updated parameters used by the distributed computing machines to perform a classification of an input using an updated neural-network based model, the updated neural-network based model robustly trained against worst-case loss induced by adversarially perturbed training examples.

11. The method of claim 10, further comprising:
compressing the aggregated gradient prior to transmitting the aggregated gradient to the plurality of distributed computing machines M.

12. The method of claim 11, wherein the aggregated gradient is compressed by quantization.

13. The method of claim 10, further comprising:
updating the parameters θ of the deep neural network-based model stored locally at the server using the aggregated gradient.

14. A non-transitory computer program product for distributed adversarial training of a deep neural network-based model by distributed computing machines M to avoid misclassification of inputs by the deep neural network and reduce a number of epochs required for training of the deep neural-network based model, the computer program product comprising a computer readable storage medium having program instructions embodied therewith, the program instructions executable by a computer to cause the computer to:
obtain, by each of the distributed computing machines M, adversarial perturbation-modified training examples for samples in a local dataset $D^{(i)}$, the training examples included labeled or unlabeled data;
compute, by each of the distributed computing machines M, local gradients of a local cost function $f_i$ with respect to parameters θ of the deep neural network-based model stored and trained locally on each of the distributed computing machines M, the local gradients of the local cost functions calculated using the adversarial perturbation-modified training examples stored locally on each of the distributed computing machines M;
transmit, from each of the distributed computing machines M, the calculated local gradients of the local cost function $f_i$ to a server which aggregates the local gradients of the local cost function $f_i$ calculated by each of the distributed computing machines M and transmits an aggregated gradient to the distributed computing machines M, the aggregated gradient calculated from the local gradients;
receive, by each of the distributed computing machines M the aggregated gradient from the server to generate an updated neural-network based model;
update, by each of the distributed computing machines M, the parameters θ of the deep neural network-based model stored at each of the distributed computing machines M based on the aggregated gradient received from the server to generate an updated neural-network based model; and
classifying an input by one or more of the distributed computing machines M using an updated neural-based model, the updated neural-network based model robustly trained against worst-case loss induced by adversarially perturbed training examples.

15. The non-transitory computer program product of claim 14, wherein the program instructions further cause the computer to:
compress the gradients of the local cost function $f_i$ prior to transmitting the gradients of the local cost function $f_i$ to the server, and wherein the aggregated gradient is compressed prior to the aggregated gradient being transmitted to the distributed computing machines M.

* * * * *